US009517417B2

(12) United States Patent
Austerlade et al.

(10) Patent No.: US 9,517,417 B2
(45) Date of Patent: Dec. 13, 2016

(54) METHOD, APPARATUS, AND COMPUTER PROGRAM PRODUCT FOR PERFORMANCE ANALYTICS DETERMINING PARTICIPANT STATISTICAL DATA AND GAME STATUS DATA

(71) Applicant: ZIH Corp., Lincolnshire, IL (US)

(72) Inventors: David Austerlade, Lincolnshire, IL (US); Gene Hofer, Lake Zurich, IL (US); James J. O'Hagan, McHenry, IL (US)

(73) Assignee: ZIH Corp., Lincolnshire, IL (US)

( * ) Notice: Subject to any disclaimer, the term of this patent is extended or adjusted under 35 U.S.C. 154(b) by 138 days.

(21) Appl. No.: 14/556,758

(22) Filed: Dec. 1, 2014

(65) Prior Publication Data

US 2015/0148129 A1 May 28, 2015

Related U.S. Application Data

(63) Continuation-in-part of application No. 13/942,316, filed on Jul. 15, 2013, now Pat. No. 9,002,485.
(Continued)

(51) Int. Cl.
*A63F 9/24* (2006.01)
*A63F 13/798* (2014.01)
(Continued)

(52) U.S. Cl.
CPC ........... *A63F 13/798* (2014.09); *A63F 13/537* (2014.09); *A63F 13/828* (2014.09);
(Continued)

(58) Field of Classification Search
CPC ..... A63F 13/798; A63F 13/537; A63F 13/828
See application file for complete search history.

(56) References Cited

U.S. PATENT DOCUMENTS 3,732,500 A 5/1973 Dishal et al.
5,119,104 A 6/1992 Heller
(Continued)

FOREIGN PATENT DOCUMENTS

EP 1235077 A2 8/2002
EP 1253438 A2 10/2002
(Continued)

OTHER PUBLICATIONS

Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.
(Continued)

*Primary Examiner* — Corbett B Coburn
(74) *Attorney, Agent, or Firm* — Alston & Bird LLP

(57) ABSTRACT

Systems, methods, apparatuses, and computer program products are disclosed for providing analytics including participant statistical data or game status data. In one embodiment, a method is provided for transmitting participant data relating to one or more participants that are available in a fantasy game, the fantasy game is at least partially related to a players performance in a sporting event; receiving a selected participant data indication from at least one user, the selected participant data indication provides selection of at least one participant from the participant data; generating a participant data update for one or more participants based on the selected participant data indication; the participant data is defined by a time period comprising an event and is calculated based on blink data transmitted from a location tag mounted to the participant; and transmitting the participant data update, the participant data update is viewable via a user interface.

15 Claims, 9 Drawing Sheets

Related U.S. Application Data

(60) Provisional application No. 61/831,990, filed on Jun. 6, 2013.

(51) Int. Cl.

| | | |
|---|---|---|
| *A63F 13/537* | (2014.01) | |
| *A63F 13/828* | (2014.01) | |
| *H04L 12/26* | (2006.01) | |
| *G06Q 50/20* | (2012.01) | |
| *G08C 17/02* | (2006.01) | |
| *G09B 19/00* | (2006.01) | |
| *H04L 29/08* | (2006.01) | |
| *H04W 4/00* | (2009.01) | |
| *H04W 4/02* | (2009.01) | |
| *G06K 7/10* | (2006.01) | |
| *G06K 9/00* | (2006.01) | |
| *G06Q 90/00* | (2006.01) | |

(52) U.S. Cl.
CPC ..... *G06K 7/10306* (2013.01); *G06K 7/10366* (2013.01); *G06Q 50/20* (2013.01); *G08C 17/02* (2013.01); *G09B 19/0038* (2013.01); *H04L 43/04* (2013.01); *H04L 67/08* (2013.01); *H04W 4/006* (2013.01); *H04W 4/028* (2013.01); *G06K 7/10227* (2013.01); *G06K 9/00342* (2013.01); *G06Q 90/00* (2013.01)

(56) References Cited

U.S. PATENT DOCUMENTS

| | | | |
|---|---|---|---|
| 5,469,409 | A | 11/1995 | Anderson et al. |
| 5,513,854 | A | 5/1996 | Daver |
| 5,645,077 | A | 7/1997 | Foxlin |
| 5,699,244 | A | 12/1997 | Clark et al. |
| 5,901,172 | A | 5/1999 | Fontana et al. |
| 5,920,287 | A | 7/1999 | Belcher et al. |
| 5,930,741 | A | 7/1999 | Kramer |
| 5,995,046 | A | 11/1999 | Belcher et al. |
| 6,028,626 | A | 2/2000 | Aviv |
| 6,121,926 | A | 9/2000 | Belcher et al. |
| 6,176,837 | B1 | 1/2001 | Foxlin |
| 6,366,242 | B1 | 4/2002 | Boyd et al. |
| 6,380,894 | B1 | 4/2002 | Boyd et al. |
| 6,593,885 | B2 | 7/2003 | Wisherd et al. |
| 6,655,582 | B2 | 12/2003 | Wohl et al. |
| 6,710,713 | B1 | 3/2004 | Russo |
| 6,812,884 | B2 | 11/2004 | Richley et al. |
| 6,836,744 | B1 | 12/2004 | Asphahani et al. |
| 6,882,315 | B2 | 4/2005 | Richley et al. |
| 7,009,638 | B2 | 3/2006 | Gruber et al. |
| 7,190,271 | B2 | 3/2007 | Boyd et al. |
| 7,667,604 | B2 | 2/2010 | Ebert et al. |
| 7,671,802 | B2 | 3/2010 | Walsh et al. |
| 7,710,322 | B1 | 5/2010 | Ameti et al. |
| 7,755,541 | B2 | 7/2010 | Wisherd et al. |
| 7,899,006 | B2 | 3/2011 | Boyd |
| 7,969,348 | B2 | 6/2011 | Baker et al. |
| 8,077,981 | B2 | 12/2011 | Elangovan et al. |
| 8,269,835 | B2 | 9/2012 | Grigsby |
| 8,279,051 | B2 | 10/2012 | Khan |
| 8,568,278 | B2 | 10/2013 | Riley et al. |
| 8,696,458 | B2 | 4/2014 | Foxlin et al. |
| 8,705,671 | B2 | 4/2014 | Ameti et al. |
| 8,775,916 | B2 | 7/2014 | Pulsipher et al. |
| 8,780,204 | B2 | 7/2014 | DeAngelis et al. |
| 8,795,045 | B2 * | 8/2014 | Sorrells .................. A63F 13/12 463/4 |
| 8,842,002 | B2 | 9/2014 | Rado |
| 8,989,880 | B2 | 3/2015 | Wohl et al. |
| 9,081,076 | B2 | 7/2015 | DeAngelis et al. |
| 2001/0010541 | A1 | 8/2001 | Fernandez et al. |
| 2001/0030625 | A1 | 10/2001 | Doles et al. |
| 2002/0004398 | A1 | 1/2002 | Ogino et al. |
| 2002/0041284 | A1 | 4/2002 | Konishi et al. |
| 2002/0114493 | A1 | 8/2002 | McNitt et al. |
| 2002/0116147 | A1 | 8/2002 | Vock et al. |
| 2002/0135479 | A1 | 9/2002 | Belcher et al. |
| 2003/0090387 | A1 | 5/2003 | Lestienne et al. |
| 2003/0095186 | A1 | 5/2003 | Aman et al. |
| 2003/0128100 | A1 | 7/2003 | Burkhardt et al. |
| 2003/0163287 | A1 | 8/2003 | Vock et al. |
| 2003/0227453 | A1 | 12/2003 | Beier et al. |
| 2004/0022227 | A1 | 2/2004 | Lynch et al. |
| 2004/0062216 | A1 | 4/2004 | Nicholls et al. |
| 2004/0108954 | A1 | 6/2004 | Richley et al. |
| 2004/0178960 | A1 | 9/2004 | Sun |
| 2004/0249969 | A1 | 12/2004 | Price |
| 2004/0260470 | A1 | 12/2004 | Rast |
| 2004/0260828 | A1 | 12/2004 | Price |
| 2005/0026563 | A1 | 2/2005 | Leeper et al. |
| 2005/0031043 | A1 | 2/2005 | Paquelet |
| 2005/0059998 | A1 | 3/2005 | Norte et al. |
| 2005/0093976 | A1 | 5/2005 | Valleriano |
| 2005/0148281 | A1 | 7/2005 | Sanchez-Castro et al. |
| 2005/0207617 | A1 | 9/2005 | Sarnoff |
| 2006/0067324 | A1 | 3/2006 | Kim |
| 2006/0139167 | A1 | 6/2006 | Davie et al. |
| 2006/0164213 | A1 | 7/2006 | Burghard et al. |
| 2006/0252476 | A1 | 11/2006 | Bahou |
| 2006/0271912 | A1 | 11/2006 | Mickle |
| 2006/0281061 | A1 | 12/2006 | Hightower et al. |
| 2007/0091292 | A1 | 4/2007 | Cho et al. |
| 2007/0176749 | A1 | 8/2007 | Boyd et al. |
| 2007/0296723 | A1 | 12/2007 | Williams |
| 2008/0065684 | A1 | 3/2008 | Zilberman |
| 2008/0106381 | A1 | 5/2008 | Adamec et al. |
| 2008/0113787 | A1 | 5/2008 | Alderucci |
| 2008/0129825 | A1 | 6/2008 | DeAngelis et al. |
| 2008/0140233 | A1 | 6/2008 | Seacat |
| 2008/0186231 | A1 | 8/2008 | Aljadeff et al. |
| 2008/0204248 | A1 | 8/2008 | Cam Winget et al. |
| 2008/0262885 | A1 | 10/2008 | Jain et al. |
| 2008/0266131 | A1 | 10/2008 | Richardson et al. |
| 2008/0269016 | A1 | 10/2008 | Ungari et al. |
| 2008/0281443 | A1 | 11/2008 | Rodgers |
| 2008/0285805 | A1 | 11/2008 | Luinge et al. |
| 2009/0231198 | A1 | 9/2009 | Walsh et al. |
| 2010/0026809 | A1 | 2/2010 | Curry |
| 2010/0045508 | A1 | 2/2010 | Ekbal et al. |
| 2010/0054304 | A1 | 3/2010 | Barnes et al. |
| 2010/0060452 | A1 | 3/2010 | Schuster et al. |
| 2010/0150117 | A1 | 6/2010 | Aweya et al. |
| 2010/0250305 | A1 | 9/2010 | Lee et al. |
| 2010/0278386 | A1 | 11/2010 | Hoeflinger |
| 2010/0283630 | A1 | 11/2010 | Alonso |
| 2010/0328073 | A1 | 12/2010 | Nikitin et al. |
| 2011/0025847 | A1 | 2/2011 | Park et al. |
| 2011/0054782 | A1 | 3/2011 | Kaahui et al. |
| 2011/0084806 | A1 | 4/2011 | Perkins et al. |
| 2011/0134240 | A1 | 6/2011 | Anderson et al. |
| 2011/0140970 | A1 | 6/2011 | Fukagawa et al. |
| 2011/0169959 | A1 | 7/2011 | DeAngelis et al. |
| 2011/0261195 | A1 | 10/2011 | Martin et al. |
| 2011/0300905 | A1 | 12/2011 | Levi |
| 2011/0320322 | A1 | 12/2011 | Roslak et al. |
| 2012/0014278 | A1 | 1/2012 | Ameti et al. |
| 2012/0024516 | A1 | 2/2012 | Bhadurt et al. |
| 2012/0057634 | A1 | 3/2012 | Shi et al. |
| 2012/0057640 | A1 | 3/2012 | Shi et al. |
| 2012/0065483 | A1 | 3/2012 | Chung et al. |
| 2012/0081531 | A1 | 4/2012 | DeAngelis et al. |
| 2012/0112904 | A1 | 5/2012 | Nagy et al. |
| 2012/0126973 | A1 | 5/2012 | DeAngelis et al. |
| 2012/0139708 | A1 | 6/2012 | Paradiso et al. |
| 2012/0184878 | A1 | 7/2012 | Najafi et al. |
| 2012/0212505 | A1 | 8/2012 | Burroughs et al. |
| 2012/0218301 | A1 | 8/2012 | Miller |
| 2012/0225676 | A1 | 9/2012 | Boyd et al. |
| 2012/0246795 | A1 | 10/2012 | Scheffler et al. |
| 2012/0256745 | A1 | 10/2012 | Plett et al. |
| 2012/0268239 | A1 | 10/2012 | Ljung et al. |
| 2013/0003860 | A1 | 1/2013 | Sasai et al. |

(56) References Cited

U.S. PATENT DOCUMENTS

| | | |
|---|---|---|
| 2013/0021142 A1 | 1/2013 | Matsui et al. |
| 2013/0021206 A1 | 1/2013 | Hach et al. |
| 2013/0041590 A1 | 2/2013 | Burich et al. |
| 2013/0066448 A1* | 3/2013 | Alonso .............. H04Q 9/00 700/91 |
| 2013/0076645 A1 | 3/2013 | Anantha et al. |
| 2013/0096704 A1 | 4/2013 | Case |
| 2013/0138386 A1 | 5/2013 | Jain et al. |
| 2013/0142384 A1 | 6/2013 | Ofck |
| 2013/0257598 A1 | 10/2013 | Kawaguchi et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1* | 8/2014 | Krysiak ............ G09B 19/0038 473/570 |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0358852 A1 | 12/2015 | Richley et al. |
| 2015/0360133 A1* | 12/2015 | MacCallum .......... A63F 13/828 463/42 |
| 2015/0375041 A1 | 12/2015 | Richley et al. |
| 2015/0375083 A1 | 12/2015 | Stelfox et al. |
| 2015/0379387 A1 | 12/2015 | Richley |
| 2016/0097837 A1 | 4/2016 | Richley et al. |

FOREIGN PATENT DOCUMENTS

| | | |
|---|---|---|
| EP | 1503513 A1 | 2/2005 |
| EP | 2474939 A1 | 11/2012 |
| WO | WO-9805977 A1 | 2/1998 |
| WO | WO 99/61936 A1 | 12/1999 |
| WO | WO 0108417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

Invention to Pay Additional Fees/Partial International Search Report for PCT/IB2015/054099 dated Oct. 6, 2015.
International Search Report and Written Opinion for International Application No. PCT/IB2015/054099 dated Dec. 9, 2015.
Defendant's Answer to Complaint before the United States District Court of Massachusetts, Civil Action No. 1:15-cv-12297, *Lynx System Developers, Inc. et al.* v. *Zebra Enterprise Solutions Corporation et al.*, filed Apr. 6, 2016.
International Search Report and Written Opinion from International Application No. PCT/US2014/040940 dated Dec. 17, 2014.
International Search Report and Written Opinion from International Application No. PCT/US2014/041062 dated Oct. 1, 2014.
International Search Report and Written Opinion from International Application No. PCT/US2014/040947 dated Oct. 9, 2014.
Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.
Gueziec, A., "Tracking Pitches for Broadcast Television," *Computer*, Aug. 7, 2002.
CattleLog Pro, *eMerge Interactive, Inc.*, Sebastian, FL, 2004.
Marchant, J., Secure Animal Identification and Source Verification, *JM Communications*, UK, 2002.
"A Guide to Using NLIS Approved Ear Tags and Rumen Boluses," National Livestock Identification Scheme, *Meat & Livestock Australia Limited*, North Sydney, Australia, May 2003.
King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).
"RFID in the Australian Meat and Livestock Industry," Allflex Australia Pty Ltd,Capalaba, QLD (AU), *Data Capture Suppliers Guide*, 2003-2004.
International Search Report and Written Opinion from International Application No. PCT/US2014/040881 dated Nov. 4, 2014.
Swedberg, Claire, "USDA Researchers Develop System to Track Livestock Feeding Behavior Unobtrusively", RFID Journal, Jul. 18, 2013.
U.S. Appl. No. 14/296,703, filed Jun. 5, 2014; In re: Alonso et al., entitle Method and Apparatus for Associating Radio Frequency Identification Tags with Participants.
U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".
International Search Report and Written Opinion for International Application No. PCT/IB2015/059264 dated Feb. 10, 2016.
Jinyun Zhang et al., "UWB Systems for Wireless Sensor Networks", Proceedings of the IEEE, IEEE. New York, US, vol. 97, No. 2, Feb. 1, 2009, pp. 313-331.
International Search Report and Written Opinion for International Application No. PCT/US2015/034267 dated Sep. 25, 2015.
International Search Report and Written Opinion for International Application No. PCT/IB2015/054103 dated Aug. 14, 2015.
Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.
International Search Report and Written Opinion for International Application No. PCT/IB2015/054213 dated Aug. 6, 2015.
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.
Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.
International Search Report and Written Opinion for International Application PCT/IB2015/054102 dated Nov. 4, 2015.
"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.
Bahle et al., "I See You: How to Improve Wearable Activity Recognition by Leveraging Information from Environmental Cameras," Pervasive Computing and Communications Workshops, IEEE International Conference, (Mar. 18-22, 2013).
Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).
Complaint before the United States District Court of Massachusetts, Civil Action No. 1:15-cv-12297, *Lynx System Developers, Inc. et al.* v. *Zebra Enterprise Solutions Corporation et al.*, filed Mar. 23, 2016.
International Search Report and Written Opinion for International Application No. PCT/US2016/035614 dated Sep. 15, 2016.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

\* cited by examiner

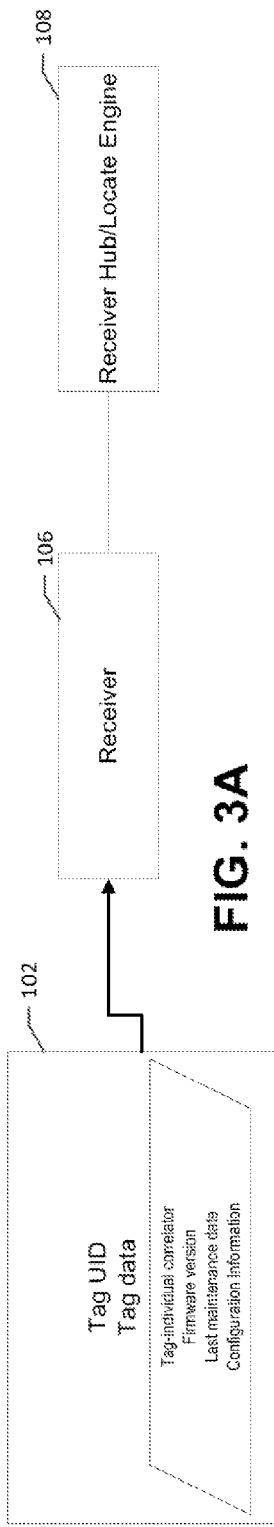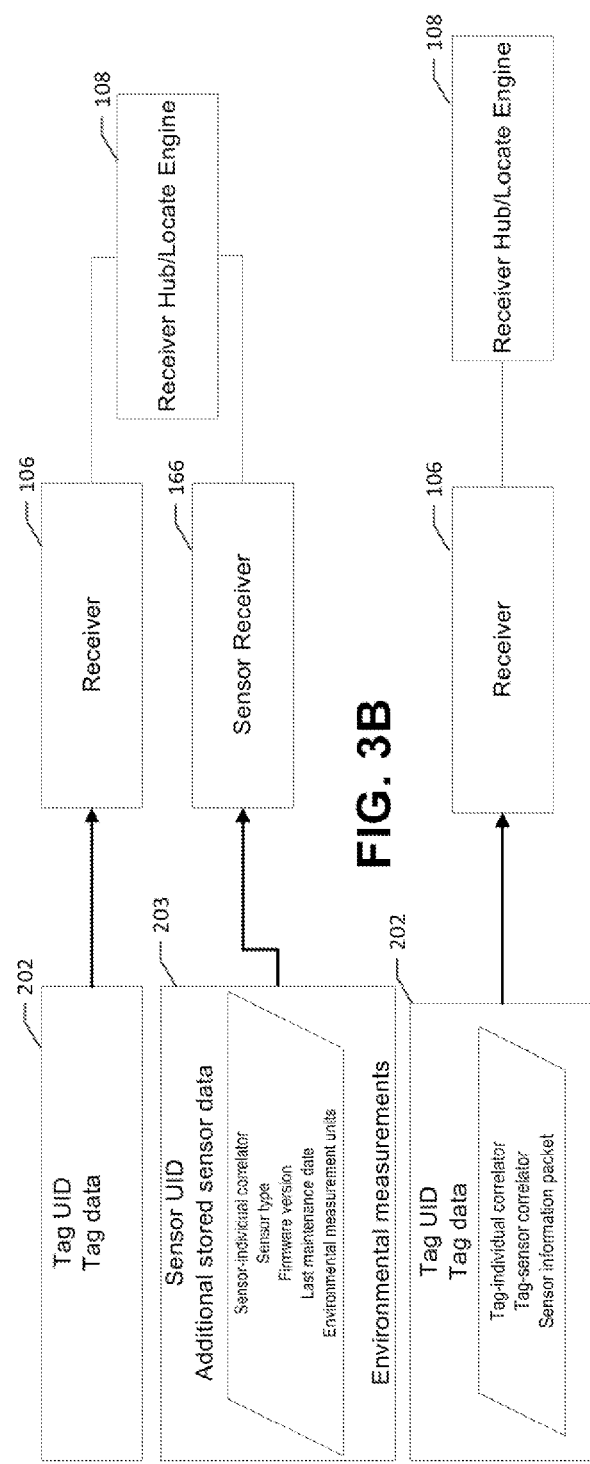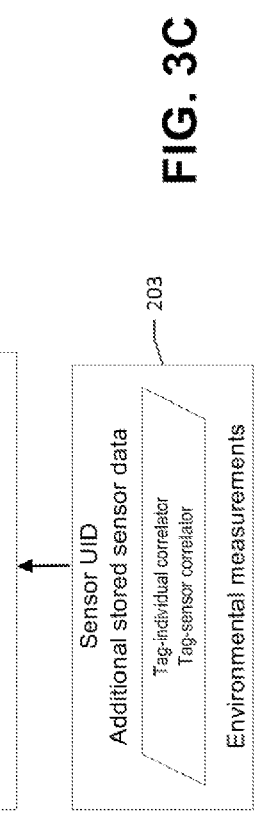

METHOD, APPARATUS, AND COMPUTER PROGRAM PRODUCT FOR PERFORMANCE ANALYTICS DETERMINING PARTICIPANT STATISTICAL DATA AND GAME STATUS DATA

CROSS-REFERENCE TO RELATED APPLICATION

This application claims priority from and is a Continuation-in-Part of U.S. patent application Ser. No. 13/942,316 filed Jul. 15, 2013, which claims priority to U.S. Provisional Patent Application No. 61/831,990 filed Jun. 6, 2013, the contents of each are incorporated by reference in their entirety herein.

FIELD OF INVENTION

Embodiments discussed herein are related to radio frequency locating and, more particularly, to systems, methods, apparatuses, computer readable media and other means for providing performance analytics to determine participant statistical data and game status data.

BACKGROUND

Producing analysis of performance for sports events and/or teams is generally a resource intensive process often involving experienced individuals manually reviewing games or recordings of games to compile events and statistics for a game and the participants. Such analysis may be error prone as it requires reviewing a large number of participants moving among complex formations at each moment of a game.

A number of deficiencies and problems associated with providing performance analytics are identified herein. Through applied effort, ingenuity, and innovation, exemplary solutions for many of these identified problems are embodied by the present invention, which is described in detail below.

BRIEF SUMMARY

Systems, methods, apparatuses, and computer readable media are disclosed for providing real-time collection and analysis of participant (e.g., player) performance, events, and statistics during a sporting event or other group activity using a locating system, such as a radio frequency locating system, as herein described.

Embodiments of the present invention may provide for automatic recognition of formations, plays, and events during a sporting event through the processing of real time (or near real time) data regarding location, change in location, change in acceleration, orientation, sensor data, or the like, for participants that comprise a team or are otherwise associated with a sporting event or other group activity and how such data fits models that define the formations, plays, and events. Once such formations, plays, and events have been defined or identified they may be used to determine participant statistical data and game status data.

In an embodiment a method is provided including transmitting participant data relating to one or more participants that are available in a fantasy game, wherein the fantasy game is at least partially related to a players performance in a sporting event, receiving a selected participant data indication from at least one user, wherein the selected participant data indication provides selection of at least one participant from the participant data, generating a participant data update for one or more participants based on the selected participant data indication; wherein the participant data is defined by a time period comprising an event and is calculated based on blink data transmitted from a location tag mounted to the participant, and transmitting the participant data update, wherein the participant data update is viewable using a user interface.

In an example embodiment, the method also includes receiving a sensor-application device correlator and the transmitting the participant data update is based on the sensor-application device correlator. In some example embodiments of the method the participant data update is further based on event determinations, wherein the event determinations are based on the participant location data satisfying a predetermined event probability threshold. In an example embodiment, the method also includes generating game status data based on the selected participant data; wherein the participant data is based on the participant location data, wherein the participant location data is calculated based on blink data transmitted from a location tag mounted to the participant and transmitting game status data.

In some example embodiments of the method, game status data is further based on event determinations, wherein the event determinations are based on the participant location data satisfying a predetermined event probability threshold. In an example embodiment, the method also includes transmitting game data related to one or more probability or statistical odd at least partially based on a predictive model based on previous sporting events, receiving a selected game data indication from at least one user, wherein the selected game data indication provides selection of at least one probability or statistical odd from the game data, generating game status data is further based on the selected game data, and transmitting game status data.

In some example embodiments, the method also includes transmitting a request to alter selected participant data, wherein the request to alter selected participant data is based on participant statistical data.

In another example embodiment, a method is provided including receiving participant data relating to one or more participants that are available in a fantasy game, wherein the fantasy game is at least partially related to a players performance in a sporting event, receiving a selected participant data indication from at least one user, the selected participant data indication provides selection of at least one participant from the participant data, transmitting the selected participant data based on the selected participant data indication, and receiving participant data update based on the selected participant data, the participant performance information is based on a time period comprising an event and is calculated based on blink data transmitted from a location tag mounted to the participant, the participant data update is viewable using a user interface.

In some example embodiments of the method, the participant data update is further based on event determinations, wherein the event determinations are based on participant location data satisfying a predetermined event probability threshold. In an example embodiment, the method also includes receiving sensor data, associating the sensor data with an application device, and transmitting a sensor-application device correlator based on the association between the sensor and the application device. In some example embodiments, the method also includes receiving game data related to one or more probabilities statistical odds at least partially based on a predictive model based on previous sporting events, receiving a selected game data indication from at least one user, wherein the selected game data indication provides selection of at least one probability or statistical odd from the game data, transmitting selected game data, and receiving game status data based on the selected participant data; wherein the participant data is based on participant location data, wherein the participant location data is calculated based on blink data transmitted from a location tag mounted to the participant.

In some example embodiments of the method, game status data is further based on event determinations, wherein the event determinations are based on the participant locations satisfying a predetermined event probability threshold. In an example embodiment, the method also includes receiving a request to alter selected participant data. In some example embodiments of the method, the request to alter selected participant data is based on updated participant data. In an example embodiment, the method also includes causing the participant data update to be displayed on a user interface. In some example embodiments, the method also includes causing the game status data to be displayed on a user interface.

In a further example embodiment, an apparatus is provided including at least one processor and at least one memory including computer program code, the at least one memory and computer program code configured to, with the processor, cause the apparatus to at least transmit participant data relating to one or more participants that are available in a fantasy game, wherein the fantasy game is at least partially related to a players performance in a sporting event, receive a selected participant data indication from at least one user, wherein the selected participant data indication provides selection of at least one participant from the participant data, generate a participant data update for one or more participants based on the selected participant data indication; wherein the participant data is defined by a time period comprising an event and is calculated based on blink data transmitted from a location tag mounted to the participant, and transmit the participant data update, wherein the participant data update is viewable using a user interface.

In an example embodiment of the apparatus, the at least one memory and the computer program code are further configured to receive a sensor-application device correlator and the transmitting the participant data update is based on the sensor-application device correlator. In some example embodiment of the apparatus, the participant data update is further based on event determinations, wherein the event determinations are based on the participant location data satisfying a predetermined event probability threshold. In an example embodiment of the apparatus, the at least one memory and the computer program code are further configured to generate game status data based on the selected participant data; wherein the participant data is based on the participant location data, wherein the participant location data is calculated based on blink data transmitted from a location tag mounted to the participant, and transmit game status data.

In some example embodiment of the apparatus, game status data is further based on event determinations, wherein the event determinations are based on the participant location data satisfying a predetermined event probability threshold. In an example embodiment of the apparatus, the at least one memory and the computer program code are further configured to transmit game data related to one or more probability or statistical odd at least partially based on a predictive model based on previous sporting events, receive a selected game data indication from at least one user, wherein the selected game data indication provides selection of at least one probability or statistical odd from the game data, generating game status data is further based on the selected game data, and transmit game status data.

In some example embodiment of the apparatus, the at least one memory and the computer program code are further configured to transmit a request to alter selected participant data, wherein the request to alter selected participant data is based on participant statistical data.

In yet another example embodiment, an apparatus is provided including at least one processor and at least one memory including computer program code, the at least one memory and computer program code configured to, with the processor, cause the apparatus to at least receive participant data relating to one or more participants that are available in a fantasy game, wherein the fantasy game is at least partially related to a players performance in a sporting event, receive a selected participant data indication from at least one user, wherein the selected participant data indication provides selection of at least one participant from the participant data, transmit the selected participant data based on the selected participant data indication, and receive participant data update based on the selected participant data; wherein the participant performance information is based on a time period comprising an event and is calculated based on blink data transmitted from a location tag mounted to the participant, wherein the participant data update is viewable using a user interface.

In some example embodiment of the apparatus, the participant data update is further based on event determinations, wherein the event determinations are based on participant location data satisfying a predetermined event probability threshold. In an example embodiment of the apparatus, the at least one memory and the computer program code are further configured to receive sensor data, associate the sensor data with an application device, and transmit a sensor-application device correlator based on the association between the sensor and the application device.

In some example embodiment of the apparatus, the at least one memory and the computer program code are further configured to receive game data related to one or more probabilities statistical odds at least partially based on a predictive model based on previous sporting events, receive a selected game data indication from at least one user, wherein the selected game data indication provides selection of at least one probability or statistical odd from the game data, transmit selected game data, and receive game status data based on the selected participant data; wherein the participant data is based on participant location data, wherein the participant location data is calculated based on blink data transmitted from a location tag mounted to the participant.

In an example embodiment of the apparatus, game status data is further based on event determinations, wherein the event determinations are based on the participant locations satisfying a predetermined event probability threshold. In some example embodiment of the apparatus, the at least one memory and the computer program code are further configured to receive a request to alter selected participant data. In an example embodiment of the apparatus, the request to alter selected participant data is based on updated participant data. In some example embodiment of the apparatus, the at least one memory and the computer program code are further configured to cause the participant data update to be displayed on a user interface. In an example embodiment of the apparatus, the at least one memory and the computer program code are further configured to cause the game status data to be displayed on a user interface.

In still further example embodiments, a computer program product is provided including at least one non-transitory computer-readable storage medium having computer-executable program code portions stored therein, the computer-executable program code portions comprising program code instructions configured to transmit participant data relating to one or more participants that are available in a fantasy game, wherein the fantasy game is at least partially related to a players performance in a sporting event, receive a selected participant data indication from at least one user, wherein the selected participant data indication provides selection of at least one participant from the participant data, generate a participant data update for one or more participants based on the selected participant data indication; wherein the participant data is defined by a time period comprising an event and is calculated based on blink data transmitted from a location tag mounted to the participant, and transmit the participant data update, wherein the participant data update is viewable using a user interface.

In an example embodiment of the computer program product, the computer-executable program code portions further comprise program code instructions configured to receive a sensor-application device correlator, and the transmitting the participant data update is based on the sensor-application device correlator. In some example embodiments of the computer program product, the participant data update is further based on event determinations, wherein the event determinations are based on the participant location data satisfying a predetermined event probability threshold. In an example embodiment of the computer program product, the computer-executable program code portions further comprise program code instructions configured to generate game status data based on the selected participant data; wherein the participant data is based on the participant location data, wherein the participant location data is calculated based on blink data transmitted from a location tag mounted to the participant and transmit game status data.

In some example embodiments of the computer program product, game status data is further based on event determinations, wherein the event determinations are based on the participant location data satisfying a predetermined event probability threshold. In an example embodiment of the computer program product, the computer-executable program code portions further comprise program code instructions configured to transmit game data related to one or more probability or statistical odd at least partially based on a predictive model based on previous sporting events, receive a selected game data indication from at least one user, wherein the selected game data indication provides selection of at least one probability or statistical odd from the game data, generating game status data is further based on the selected game data, and transmit game status data.

In some example embodiments of the computer program product, the computer-executable program code portions further comprise program code instructions configured to transmit a request to alter selected participant data, wherein the request to alter selected participant data is based on participant statistical data.

In an example embodiments, a computer program product is provided including at least one non-transitory computer-readable storage medium having computer-executable program code portions stored therein, the computer-executable program code portions comprising program code instructions configured to receive participant data relating to one or more participants that are available in a fantasy game, wherein the fantasy game is at least partially related to a players performance in a sporting event, receive a selected participant data indication from at least one user, wherein the selected participant data indication provides selection of at least one participant from the participant data, transmit the selected participant data based on the selected participant data indication, and receive participant data update based on the selected participant data; wherein the participant performance information is based on a time period comprising an event and is calculated based on blink data transmitted from a location tag mounted to the participant, wherein the participant data update is viewable using a user interface.

In some example embodiments of the computer program product, the participant data update is further based on event determinations, wherein the event determinations are based on participant location data satisfying a predetermined event probability threshold. In an example embodiment of the computer program product, the computer-executable program code portions further comprise program code instructions configured to receive sensor data, associate the sensor data with an application device and transmit a sensor-application device correlator based on the association between the sensor and the application device.

In some example embodiments of the computer program product, the computer-executable program code portions further comprise program code instructions configured to receive game data related to one or more probabilities statistical odds at least partially based on a predictive model based on previous sporting events, receive a selected game data indication from at least one user, wherein the selected game data indication provides selection of at least one probability or statistical odd from the game data, transmit selected game data, and receive game status data based on the selected participant data; wherein the participant data is based on participant location data, wherein the participant location data is calculated based on blink data transmitted from a location tag mounted to the participant.

In an example embodiment of the computer program product, the computer-executable program code portions further comprise program code instructions configured to game status data is further based on event determinations, wherein the event determinations are based on the participant locations satisfying a predetermined event probability threshold. In some example embodiments of the computer program product, the computer-executable program code portions further comprise program code instructions configured to receive a request to alter selected participant data.

In an example embodiment of the computer program product, the computer-executable program code portions further comprise program code instructions configured to the request to alter selected participant data is based on updated participant data. In some example embodiments of the computer program product, the computer-executable program code portions further comprise program code instructions configured to cause the participant data update to be displayed on a user interface. In an example embodiment of the computer program product, the computer-executable program code portions further comprise program code instructions configured to the computer-executable program code portions further comprise program code instructions configured to cause the game status data to be displayed on a user interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates an exemplary environment using a radio frequency locating system for providing performance analytics in accordance with some embodiments of the present invention;

FIGS. 2A-C illustrate some exemplary participants carrying tags and sensors that may provide information to a performance analytics system in accordance with some embodiments of the present invention;

FIGS. 3A-3E are block diagrams showing the input and output of receivers and sensor receivers in accordance with an example embodiment;

DETAILED DESCRIPTION

Figure 1:
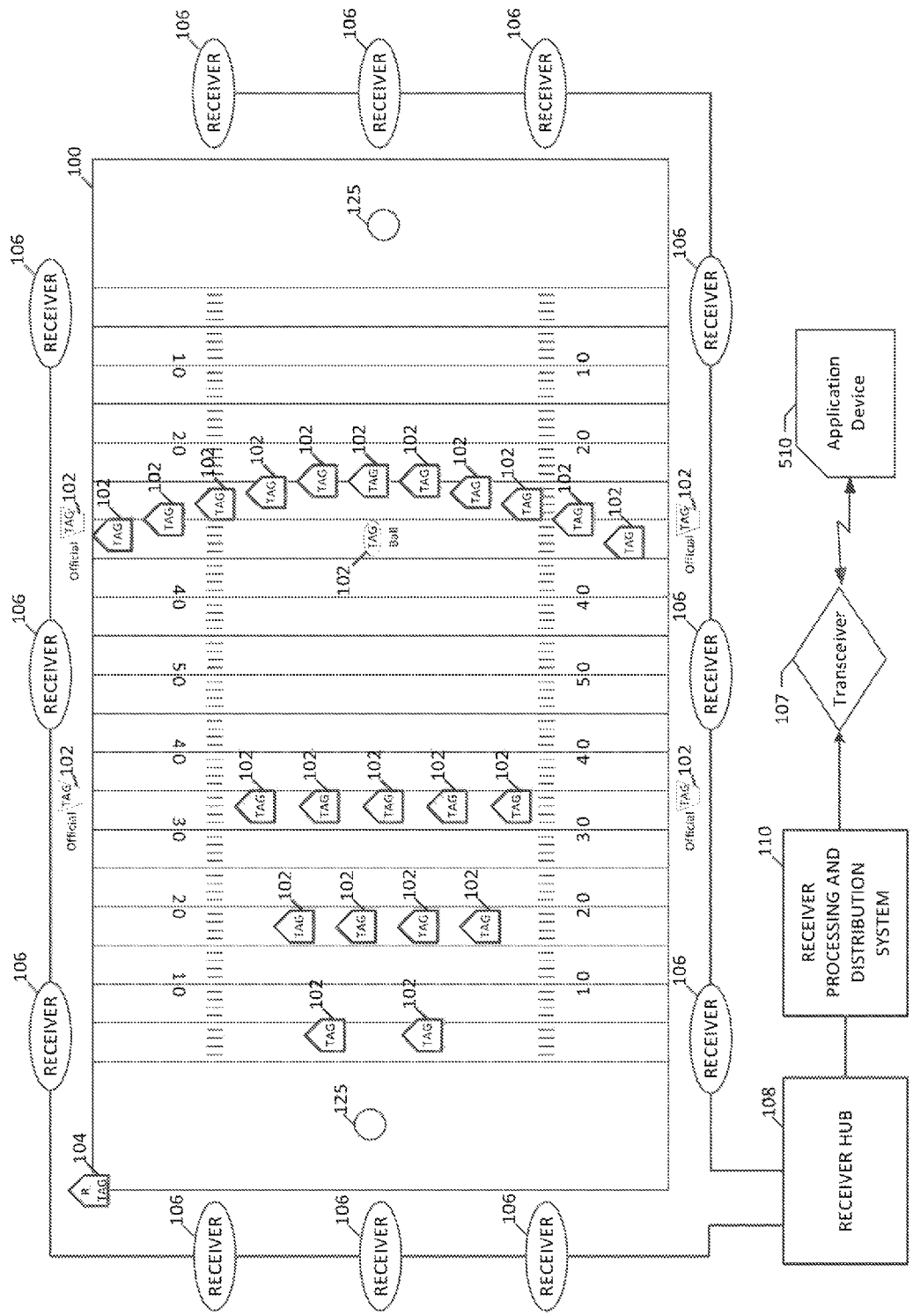

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are illustrated in the appended figures and description below in relation to the sport of American football. However, as will be apparent to one of ordinary skill in the art in view of this disclosure, the inventive concepts herein described are not limited to football and may be applied to various other applications including, without limitation, other sports or group events such as baseball, basketball, golf, hockey, soccer, racing or motorsports, competitive events, and the like.

Overview

Existing performance analytics of sporting events have drawbacks in providing accurate data about events and participant actions that occur during a game. Game day data is often manually collected by individuals documenting participant actions and play participation during a game. Performance review of a game often requires individuals to manually review game recordings over a number of hours after a game to compile or otherwise verify player actions and events during play. This performance review is also often limited to statistics and data that can be identified or captured by the individuals watching or reviewing a game or game film. In addition, such review and any analytics data flowing therefrom is provided freely on a non-exclusive basis as anyone with access to game film can compile similar analytics data.

Embodiments of the present invention are directed to methods, systems, apparatuses, and computer readable storage media for providing real-time collection of data and analysis of participant performance and play statistics during a game such as by using radio frequency locating systems, radio frequency identification ("RFID") and/or the like. Using such real-time collection of data analysis, statistical information, player date, performance data or the like can be used to enhance the experience by advantageously, in some examples, providing a data mix to users not previously available. In some examples, the data mix may allow for detection of formations plays or the like, whereas other examples may enhance off the field of play experiences such as fantasy sport activity (e.g., fantasy football) or player tracking.

Embodiments of the present invention may provide for automatic recognition of formations, plays, and events through the processing of real time data (or near real time data) regarding location, change in location, velocity, change in acceleration, orientation, or the like, for participants (e.g., players, officials, game related objects such as the ball, penalty markers, line of scrimmage and yard to gain markers, and any other movable object proximate a field of play) based on an analysis of relevant models and data as described in detail below.

In embodiments where participants are players, a group or plurality of participants may be grouped into squads (e.g., offense, defense, kickoff, punt, kick return, punt return, field goal, infield, outfield, bullpen, etc.) and/or teams (e.g., football team, baseball team, swim team, etc.). Participants on the same team are called teammates; participants on different teams are called adversaries.

Embodiments of the present invention may provide for automated data collection with reduced errors, as well as providing additional statistics that may not be available with current systems. Additionally, embodiments may provide for rapid (i.e., near instantaneous) production of game review documentation (e.g., playbooks). Embodiments of the present invention may also provide additional and exclusive data and analysis that may be securely licensed without concern that similar analytics may be readily reproduced without a system configured as set forth below.

Embodiments of the present invention may allow for the simultaneous tracking of a plurality of participants and may provide for indications of player statistics and/or potential play events in real time (or near real time). Such indications may be output to a variety of systems including, without limitation, a visualization system (e.g., an enhanced television broadcast system or computer graphics visualization system), a game operations system, a camera control system, a team analytics system, a league analytics system, and a statistics system.

Embodiments of the present invention may allow for selection of specific participants, squads or teams the monitoring and participant data update associated with an individual participant, a squad, or team performance information and/or event determinations. Further, embodiments of the present invention may allow for a wider array of participant statistical data than could be provided without a system configured as below. In some embodiments the participant statistical data may be used to award points in a game associated with the event, such as fantasy football.

Embodiments of the present invention may allow for game data to be generated based on predictive models. Such game data may be updated with real time information providing an indication of the accuracy the prediction and completion of the game data predictions. Further, in some embodiments the game data may be wagered on, may be used in an off the field competition or the like. As noted herein, advantageously, this game data may be updated in real time.

Example RF Locating System Architecture

FIG. 1 illustrates an exemplary locating system useful for calculating a location of a participant by an accumulation of position data or time of arrivals (TOAs) at a Receiver Hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to enable a phase offset between the counters associated with at least a subset of the of the receivers 106. The RTLS tags 102 and the reference tags 104 reside in an active RTLS field 100. The systems described herein may be referred to as either "multilateration" or "geolocation" systems, terms that refer to the process of locating a signal source by solving an error minimization function of a position estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the rate is sufficiently low. In such examples, the predicted maximum range of the system, operating with a center frequency of 6.55 GHz, is roughly 200 meters in instance in which a 12 dbi directional antenna is used, but the project range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2.5 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 110, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the length of the information packets, in conjunction with other packet rate, data rates and other system requirements, may also result in a longer battery life (e.g., 7 years battery life at a transmission rate of 1 Hz with a 300 mAh cell, in some present embodiments).

In some examples, the tag 102 may employ UWB waveforms to achieve extremely fine resolution because of their extremely short pulse (e.g., 2.5 nsec) durations. Furthermore, signals may comprise brief information packets (e.g., 112 bits of OOK) at a somewhat high burst data rate (1 Mb/sec, in some example embodiments), that advantageously enable packet durations to be short (e.g. 112 usec) while allowing inter-pulse times (e.g., 997.5 nsec) sufficiently longer than expected echo delays. Echo (or multipath) delays result from reflections and, if sufficiently strong to be detected, can corrupt a data transmission through inter-symbol interference.

Reflected signals can be expected to become weaker as delay increases due to the longer distances traveled, and more reflections experienced. Thus, beyond some value of inter-pulse time (e.g., 997.5 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations.

Minimization of the packet duration also allows a tag to transmit more packets in a given time, although in practice, regulatory average EIRP limits may often provide an overriding constraint. However, short packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

As one non-limiting example, a data packet length of 112 bits (e.g., OKK encoded), transmitted at a data rate of 1 Mb/sec (a MHz), may be implemented with a transmit tag repetition rate of 12 transmissions per second (12 TX/sec). Such an implementation may accommodate a battery life of up to seven years, wherein the battery itself may be, for example, a compact, 3-volt coin cell of the series no. BR2335 (Rayovac), with a battery charge rating of 300 mAhrs. An alternate implementation may be a generic compact, 3-volt coin cell, series no. CR2032, with a battery charge rating of 220 mAhrs, whereby the latter generic coin cell, as can be appreciated, may provide for a proportionately shorter battery life.

The high burst data transmission rate (e.g., 1 MHz), coupled with the short data packet length (e.g., 112 bits) and the relatively low repetition rates (e.g., 12 TX/sec), provide for two distinct advantages in some examples: (1) a greater number of tags may transmit independently from the field of tags with a lower collision probability, and (2) each independent tag transmit power may be increased, with proper consideration given to a battery life constraint, such that a total energy for a single data packet is less that an regulated average power for a given time interval (e.g., a 1 msec time interval for an FCC regulated transmission).

Alternatively or additionally, additional telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some example once every 720 times the data packet is transmitted, whereby the data packet in this example is transmitted at an example rate of 12 TX/sec.

Alternatively or additionally, the tag 102 may be programmed to intermittently transmit temperature data to the receivers 106 by a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 themselves may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receiver's 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, reduce latency, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 110 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog, signals are transmittable to the Receiver hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Receiver hub 108 (e.g., the data cables may enable a transfer speed of 2 Mbps). In some examples, measurement data is transferred to the Receiver hub at regular polling intervals.

As such, the Receiver hub 108 determines or otherwise computes tag position (i.e., object position) by processing TOA measurements relative to multiple data packets detected by the receivers 106. In some example embodiments, Receiver hub 108 may be configured to resolve the coordinates of a tag using nonlinear optimization techniques.

TOA measurements from multiple receivers 106 are processed by the Receiver hub 108 to determine a position of the transmit tag 102 by a differential time-of-arrival (DTOA) analysis of the multiple TOAs. The DTOA analysis includes a determination of tag transmit time t0, whereby a time-of-flight (TOF), measured as the time elapsed from the estimate tag transmit time t0 to the TOA, represents graphically the radii of spheres centered at respective receivers 106. The distance between the surfaces of the respective spheres the estimated position coordinates ($x_0$, $y_0$, $z_0$) of the transmit tag 102 represents the measurement error for each respective TOA, and the minimization of the sum of the squares of the TOA measurement errors from each receiver participating in the DTOA position estimate provides for the position coordinates ($x_0$, $y_0$, $z_0$) and of the tag transmit time t0.

In some examples, the system described herein may be referred to as an "over-specified" or "over-determined" system. As such, the Receiver hub 108 may then calculate one or more valid (i.e., most correct) positions based on a set of measurements and/or one or more incorrect (i.e., less correct) positions. For example, a position may be calculated that is impossible due the laws of physics or may be an outlier when compared to other positions. As such one or more algorithms or heuristics may be applied to minimize such error.

One such algorithm for error minimization, which may be referred to as a time error minimization algorithm, may be described in Equation 1:

$$\epsilon = \sum_{j=1}^{N} [[(x-x_j)^2 + (y-y_j)^2 + (z-z_j)^2]^{1/2} - c(t_j - t_0)]^2 \quad (1)$$

Where N is the number of receivers, c is the speed of light, $(x_j, y_j, z_j)$ are the coordinates of the $j^{th}$ receivers, and $t_j$ is the arrival time at the $j^{th}$ receiver. Note that only time differences may be evaluated at Receiver hub 108 in some example embodiments. The starting point for the minimization may be obtained by first doing an area search on a coarse grid of x, y and z over an area defined by the user and followed by a localized steepest descent search.

The variable $t_0$ represents an absolute time epoch. The starting point for this algorithm is fixed, in some examples, at the geometric mean position of all active receivers. No initial area search is needed, and optimization proceeds through the use of a Davidon-Fletcher-Powell (DFP) quasi-Newton algorithm in some examples. In other examples, a steepest descent algorithm may be used.

In order to determine the coordinates of a tag, in some examples and for calibration purposes, a reference tag 104 is positioned at a known coordinate position $(x_T, y_T, z_T)$.

In further example embodiments, a number N of receivers 106 $\{R_j: j=1, \ldots, N\}$ are positioned at known coordinates $(x_{R_j}, y_{R_j}, z_{R_j})$, which are respectively located at distances $d_{R_j}$ from a reference tag, such as given in Equation 2:

$$d_{R_j} = \sqrt{(x_{R_j} - x_T)^2 + (y_{R_j} - y_T)^2 + (z_{R_j} - z_T)^2} \quad (2)$$

Each receiver $R_j$ utilizes, for example, a synchronous clock signal derived from a common frequency time base, such as clock generator. Because the receivers are not synchronously reset, an unknown, but constant, offset $O_j$ exists for each receiver's internal free running counter. The value of the offset $O_j$ is measured in terms of the number of fine resolution count increments (e.g., a number of nanoseconds for a one nanosecond resolution system).

The reference tag is used to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta \tau_R + O_j + \beta d_{R_j}/c \quad (3)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta \tau_i + O_j + \beta d_{ij}/c \quad (4)$$

At receiver $R_j$ where $d_{ij}$ is the distance between the object tag $T_i$ and the receiver 106 at receiver $R_j$. Note that $\tau_i$ is unknown, but has the same constant value for receivers 106 of all receivers $R_j$. Based on the equalities expressed above for receivers $R_j$ and $R_k$ and given the reference tag 104 information, differential offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and tag are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the differential offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{ij} - N_{ik} = (O_j - O_k) + \beta\left(\frac{d_{ij}}{c} - \frac{d_{ik}}{c}\right) = \Delta_{jk} + \beta\left(\frac{d_{ij}}{c} - \frac{d_{ik}}{c}\right) \quad (6a)$$

Or, $$d_{ij} - d_{ik} = (c/\beta)[N_{ij} - N_{ik} - \Delta_{jk}] \quad (6b)$$

Where each arrival time, $t_j$, is referenced to a particular receiver (receiver "1") as given in Equation 7:

$$t_j = \frac{1}{\beta}(N_j - \Delta_{j1}) \quad (7)$$

And the minimization described in Equation 1 is performed over variables (x, y, z, $t_o$) to reach a solution (x', y', z', $t_0$').

In some example embodiments, the location of a tag 102 may then be output to a receiver processing and distribution system 110 for further processing of the location data to advantageously provide visualizations, predictive analytics, statistics and/or the like.

The exemplary radio frequency locating system of FIG. 1 may be used in providing performance analytics in accordance with some embodiments of the present invention. In the environment of FIG. 1, data may be captured and analyzed, such as during a sporting event to identify events, statistics, and other data useful to a sports team, league, viewer, licensee, or the like. In some embodiments, data associated with a number of objects or participants (e.g., players, officials, balls, game equipment, etc.) on a playing field, such as monitored area 100, may be generated and provided to a performance analytics system. As such, as further discussed in connection with FIGS. 2A-C below, each object may have one or more attached tags 102 (such as to equipment worn by a player) to be used to track data such as location, change of location, speed, or the like of each object. In some embodiments, additional sensors, such as, without limitation, accelerometers, magnetometers, time-of-flight sensors, health sensors, temperature sensors, moisture sensors, light sensors, or the like, may be attached to each object to provide further data to the performance analytics system. Such additional sensors may provide data to the tag 102, either through a wired or wireless connection, to be transmitted to the receivers 106 or the sensors may be configured to transmit data to receivers (i.e., sensor receivers) separately from tags 102.

One or more of the receivers 106 may receive transmissions from tags 102 and transmit the blink data to a receiver hub 108. The receiver hub 108 may process the received data to determine tag location for the tags 102. The receiver hub 108 may transmit the tag location data to one or more processors, such as receiver processing and distribution system 110. Receiver processing and distribution system 110 may use one or more modules (e.g., processing engines) and one or more databases to identify the object each of the tags 102 is associated with, such as a player, official, ball, or the like.

In some embodiments, multiple tags 102 (as well as other sensors) may be attached to the equipment worn by an individual player, official, or other participant. The receiver processing and distribution system 110 may use one or more databases to associate the tag identifier (e.g., a tag UID) of each tag 102 with each player, official, object, or other participant and correlate the tag location data and/or other tag and sensor derived data for multiple tags 102 that are associated with a particular player, official, object, or other participant.

As discussed in greater detail below, the receiver processing and distribution system 110 may then use the tag location data and/or other tag and sensor derived data to determine player dynamics, such as a player's location, how the location is changing with time, orientation, velocity, acceleration, deceleration, total yardage, or the like. The receiver processing and distribution system 110 may also use the tag location data and/or other tag and sensor derived data to determine dynamics for other participants such as the officials, the ball, penalty markers, line of scrimmage or yards to gain markers, or the like, for use in generating data for performance analytics. The receiver processing and distribution system 110 may also use the data and one or more databases to determine team formations, play activity, events, statistics, or the like, such as by comparing the data to various models to determine the most likely formation or play or the events that have occurred during a game. The receiver processing and distribution system 110 may also use the data to provide statistics or other output data for the players, teams, and the game.

In some embodiments the receiver processing and distribution system 110 may transmit and receive participant data, selected participant data indications, participant data update, game data, selected game data indications, game status data, location data, or any other information received or generated by the receiver hub 108 or receiver processing and distribution system through a transceiver 107. The various data may be received, displayed, stored, selected, or any manipulated by other means by an application device 510. The application device may include without limitation, a smart phone, tablet computer, personal data assistant (PDA), laptop computer, desktop computer, or any other type of computing device.

As will be apparent to one of ordinary skill in the art, the inventive concepts herein described are not limited to use with the UWB based RF locating system shown in FIG. 1. Rather, in various embodiments, the inventive concepts herein described may be applied to various other locating systems especially those that are configured to provide robust location resolution (i.e., subfoot location resolution).

Example Tag/Sensor Positioning and Participant Correlation

FIG. 1 shows a monitored area 100. The monitored area 100 comprises a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location is a description of a position, or a plurality of positions, within the monitored area. For example, a field marker at the intersection of the south goal line and west out of bounds line at Bank of America Stadium in Charlotte, N.C. could be described as {0,0,0} in a local NED system, or 35.225336 N 80.85273 W longitude 751 ft. altitude on a latitude-longitude system, or simply "Panthers Goal Line" in a yard line system. Because different types of locating systems or different zones within a single locating system may use different coordinate systems, a Geographical Information System or similar monitored area database may be used to associate location data. One type of Geographical Information System describing at least a field of play may be called Field Data.

Figure 2A:
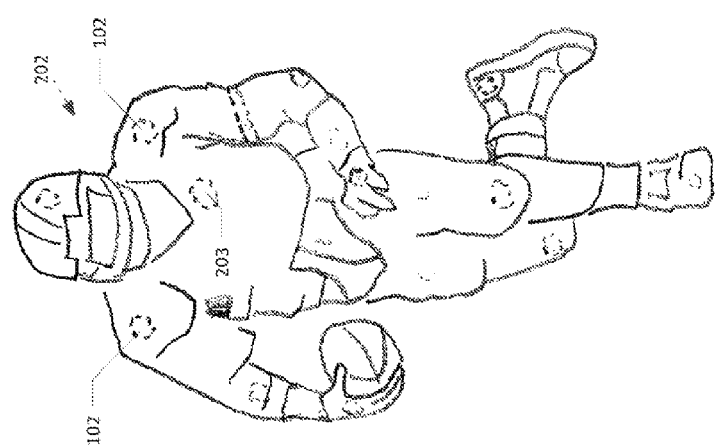
Figure 2B:
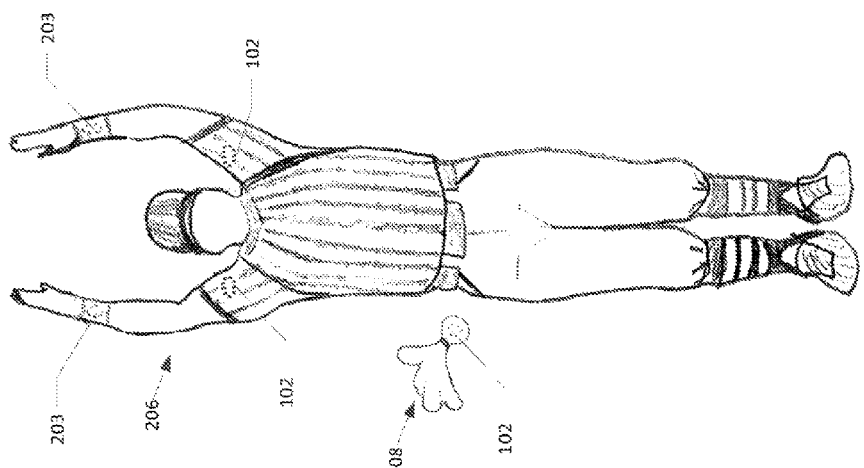
Figure 2C:
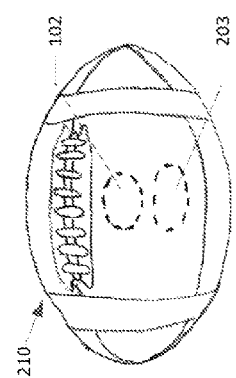

FIGS. 2A-C illustrate some exemplary participants that may provide information to a performance analytics system in accordance with some embodiments of the present invention. FIG. 2A illustrates a player 202 (e.g., a football player) wearing equipment having attached tags 102 in accordance with some embodiments. In particular, the depicted player 202 is wearing shoulder pads having tags 102 affixed to opposite sides thereof. This positioning advantageously provides an elevated broadcast position for each tag 102 thereby increasing its communication effectiveness.

Additional sensors 203 may be attached to equipment worn by player 202, such as accelerometers, magnetometers, time-of-flight sensors, health monitoring sensors (e.g., blood pressure sensors, heart monitors, respiration sensors, moisture sensors, temperature sensors), light sensors, or the like. The additional sensors 203 may be affixed to shoulder pads, the helmet, the shoes, rib pads, elbow pads, the jersey, the pants, a bodysuit undergarment, gloves, arm bands, wristbands, and the like.

Sensors 203 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps positioned in the helmet, which may transmit sensor data to one or more receivers.

FIG. 2B illustrates a game official 206 wearing equipment having attached tags 102 and sensors 203 in accordance with some embodiments. In the depicted embodiment, tags 102 are attached to the official's jersey proximate opposite shoulders. Sensors 203 are positioned in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2A.

As discussed in greater detail below, the positioning of sensors 203 (here, accelerometers) proximate the wrists of the official may allow the receiver processing and distribution system 110 to determine particular motions, movements, or activities of the official 206 for use in determining events (e.g., winding of the game clock, first down, touchdown, or the like). The official 206 may also carry other equipment, such as penalty flag 208, which may also have a tag 102 (and optionally one or more sensors) attached to provide additional data to the receiver processing and distribution system 110. For example, the receiver processing and distribution system 110 may use tag location data from the penalty flag 208 to determine when the official is merely carrying the penalty flag 208 versus when the official is using the penalty flag 208 to indicate an event, such as a penalty (e.g., by throwing the penalty flag 208).

FIG. 2C illustrates an example of a ball 210 having tags 102 attached or embedded in accordance with some embodiments. Additionally, sensors 203 may be attached to or embedded in the ball 210, such as accelerometers, time-of-flight sensors, or the like. In some embodiments, the sensor 203 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2A.

As will be apparent to one of ordinary skill in the art in view of this disclosure, once the tags 102 and sensors 203 of FIGS. 2A-C are positioned on participants, they may be correlated to such participants. For example, in some embodiments, unique tag or sensor identifiers ("unique IDs") may be correlated to a participant profile (e.g., John Smith—running back, Fred Johnson—line judge official, or ID 027—one of several game balls, etc.) and stored to a remote database accessible to the performance analytics system as discussed in greater detail below. Each participant profile may further include or be correlated with a variety of data including, but not limited to, biometric data (e.g., height, weight, health data, etc.), role data, team ID, performance statistics, and other data that may be apparent to one of skill in the art in view of the foregoing description.

In some embodiments, such participant profile or role data may be pre-defined and stored in association with the unique tag or sensor identifiers. In other embodiments, the participant profile or role data may also be "learned" by the system as a result of received tag or sensor data, formation data, play data, event data, and/or the like. For example, in some embodiments the system may determine that a tag or sensor is not correlated to a participant profile and may analyze data received from the tag and/or sensor to determine possible participant roles, etc., which may be ranked and then selected/confirmed by the system or by a user after being displayed by the system. In some embodiments, the system may determine possible participant roles (i.e., participant role data) based on determined participant location data (e.g., movement patterns, alignment position, etc.).

In some embodiments, as described in greater detail below, the participant profile or role data may also be updated by the system (i.e., to produce a data set for the participant that is far more robust than that established at initial registration) as a result of received tag or sensor data, formation data, play data, event data, and/or the like. In some embodiments, the participant profile and/or role data may be used in a performance analytics system to weight the actions of the participants during analysis to assist in qualifying what is occurring, such as in determining formations, plays, events, etc.

Tag ID and Sensor Data Transmission Architecture

FIGS. 3A, 3B, 3C, 3D, and 3E show block diagrams of various different architectures that may be utilized in transmitting signals from one or more tags and sensors to one or more receivers of a receiver processing and analytics system in accordance with embodiments of the invention. In some embodiments, the depicted architectures may be used in connection with the receiver processing and analytics system 110 of FIG. 1. More than one of these architectures may be used together in a single system.

FIG. 3A shows a location tag 102, such as that shown in FIG. 1, which may be configured to transmit a tag signal to one or more receivers 106. The one or more receivers 106 may transmit a receiver signal to the receiver hub/locate engine 108.

The depicted location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator may comprise data that indicates that a monitored individual (e.g., participant) is associated with the location tag 102 (e.g. name, uniform number and team, biometric data, tag position on individual, i.e., right wrist). As will be apparent to one of skill in the art in view of this disclosure, the tag-individual correlator may be stored to the location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the location tag 102 may be determined by the locating system. Blink data may also comprise one or more tag data packets. Such tag data packets may include any data from the tag 102 that is intended for transmission such as, for example in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a Location tag 102 (e.g., a UWB tag).

The depicted receiver 106 receives the tag signal, which includes blink data and tag data packets as discussed above. In one embodiment, the receiver 106 may pass the received tag signal directly to the receive hub/locate engine 108 as part of its receiver signal. In another embodiment, the receiver 106 could perform some basic processing on the received tag signal. For instance, the receiver could extract blink data from the tag signal and transmit the blink data to the receive hub/locate engine 108. The receiver could transmit a time measurement to the receive hub/locate engine 108 such as a TOA measurement and/or a TDOA measurement. The time measurement could be based on a clock time generated or calculated in the receiver, it could be based on a receiver offset value as explained at paragraph 79 above, it could be based on a system time, and/or it could be based on the time difference of arrival between the tag signal of the location tag 102 and the tag signal of a RF reference tag (e.g., tag 104 of FIG. 1). The receiver 106 could additionally or alternatively determine a signal measurement from the tag signal (such as a received signal strength indication (RSSI), a direction of signal, signal polarity, or signal phase) and transmit the signal measurement to the receive hub/locate engine 108.

FIG. 3B shows a location tag 202 and sensor 203, such as those worn on an individual's person as shown in FIG. 2, which may be configured to transmit tag signals and sensor signals, respectively, to one or more receivers 106, 166. The one or more receivers 106, 166 may then transmit receiver signals to the receiver hub/locate engine 108. One or more receivers 106, 166 may share physical components, such as a housing or antenna.

The depicted location tag 202 may comprise a tag UID and tag data (such as a tag-individual correlator) and transmit a tag signal comprising blink data as discussed in connection with FIG. 3A above. The depicted sensor 203 may generate and/or store a sensor UID, additional stored sensor data (e.g. a sensor-individual correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a Location tag 202, a reference tag (e.g., 104 of FIG. 1), a sensor receiver, a receiver 106, and/or the receiver/hub locate engine 108.

The sensor-individual correlator may comprise data that indicates that a monitored individual is associated with the sensor 203 (e.g., name, uniform number and team, biometric data, sensor position on individual, i.e., right wrist). As will be apparent to one of skill in the art in view of this disclosure, the sensor-individual correlator may be stored to the sensor 203 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 203 that are structured according to embodiments of the invention may sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the depicted embodiment, location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to receiver hub/locate engine 108 as shown.

FIG. 3C depicts a sensor 203 communicating through a location tag 202 in accordance with various embodiments. In one embodiment, the sensor 203 may be part of (i.e., reside in the same housing or assembly structure) of the location tag 202. In another embodiment, the sensor 203 may be distinct from (i.e., not resident in the same housing or assembly structure) the Location tag 202 but configured to communicate wirelessly or via wired communication with the location tag 202.

In one embodiment, the location tag 202, the sensor 203, or both, may generate and/or store a tag-sensor correlator that indicates an association between a location tag 202 and a sensor 203 (e.g., tag UID/sensor UID, distance from tag to sensor in a particular stance, set of sensors associated with a set of tags, sensor types associated with a tag, etc.). In the depicted embodiment, both the location tag 202 and the sensor 203 store the tag-sensor correlator.

In the depicted embodiment, sensor 203 transmits a sensor signal to location tag 202. The sensor signal may comprise one or more sensor information packets as discussed above. The sensor information packets may comprise the sensor UID, a sensor-individual correlator, additional stored sensor data, the tag-sensor correlator, and/or the environmental measurements. The location tag 202 may store some portion of, or all of, the sensor information packets locally and may package the sensor information packets into one or more tag data packets for transmission to receiver 106 as part of a tag signal or simply pass them along as part of its tag signal.

Figures 3D, 3E:
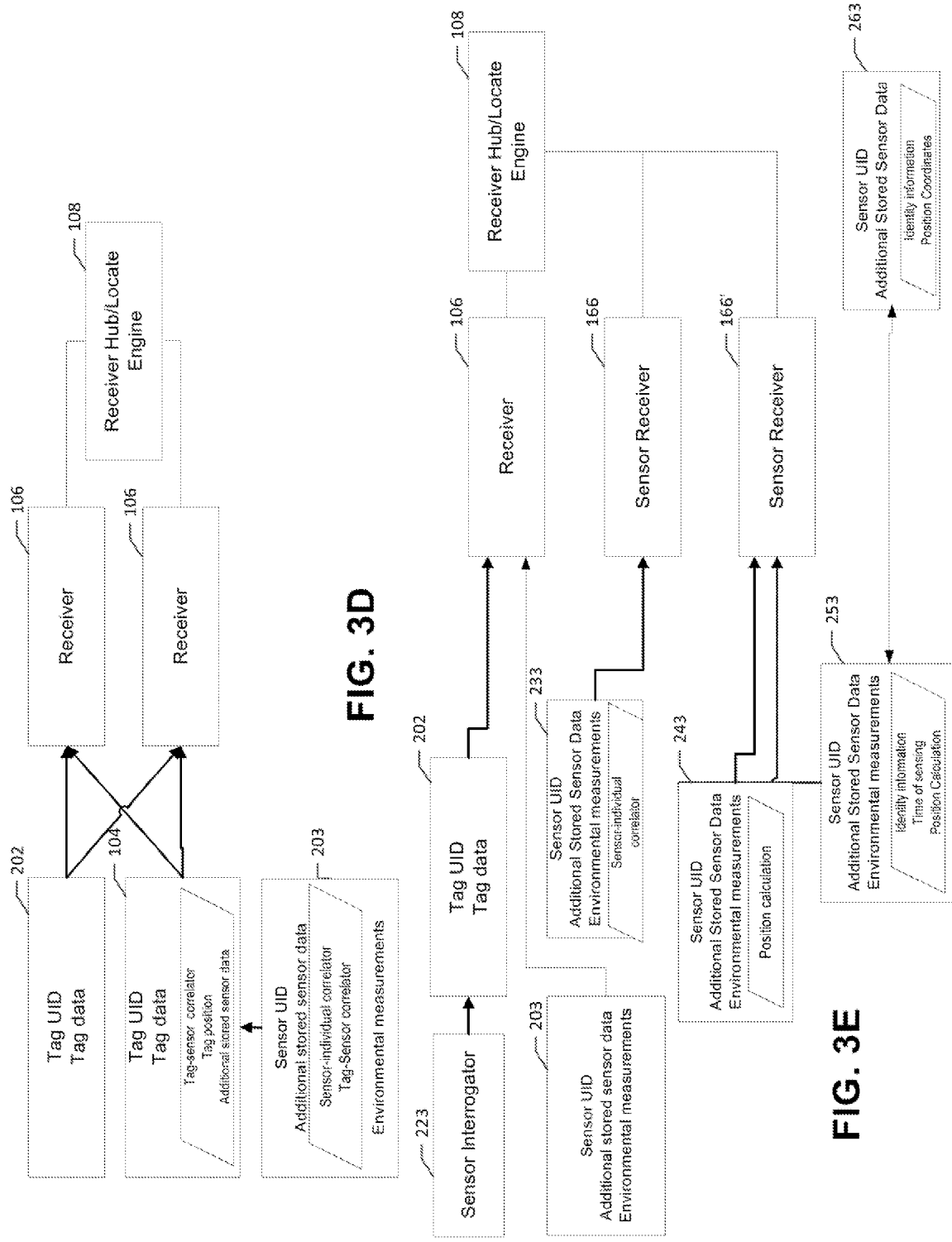

FIG. 3D illustrates an example communication structure for a reference tag 104 (e.g., reference tag 104 of FIG. 1), a location tag 202, a sensor 203, and two receivers 106 in accordance with one embodiment. The depicted reference tag 104 is a Location tag and thus may include tag data, a tag UID, and is capable of transmitting tag data packets. In some embodiments, the reference tag 104 may form part of a sensor and may thus be capable of transmitting sensor information packets.

The depicted sensor 203 transmits a sensor signal to reference tag 104. The reference tag 104 may store some portion or some or all of the sensor information packets locally and may package the sensor information packets into one or more tag data packets for transmission to receiver 106 as part of a tag signal, or simply pass them along as part of its tag signal.

As was described above in connection with FIG. 1, the receivers 106 of FIG. 3D are configured to receive tag signals from the location tag 202 and the reference tag 104. Each of these tag signals may include blink data, which may comprise tag UIDs, tag data packets, and/or sensor information packets. The receivers 106 each transmit receiver signals via wired or wireless communication to the receiver hub/locate engine 108 as shown.

FIG. 3E illustrates an example communication structure between a location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of a location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from location tag 202 and a sensor signal directly from sensor 203. In such embodiments, sensor 203 may be configured to communicate in a communication protocol that is common to location tag 202 as will be apparent to one of ordinary skill in the art in view of this disclosure.

FIG. 3E depicts one type of sensor referred to herein as a "proximity interrogator". The proximity interrogator 223 can include circuitry operative to generate a magnetic, electromagnetic, or other field that is detectable by a location tag 202. While not shown in FIG. 3E, a proximity interrogator 223 may include a sensor UID and other tag and sensor derived data or information as discussed above.

In some embodiments, the proximity interrogator 223 is operative as a proximity communication device that can trigger a location tag 202 (e.g., when the location tag 202 detects the field produced by the proximity interrogator 223) to transmit blink data under an alternate blink pattern or blink rate. The location tag can initiate a preprogrammed (and typically faster) blink rate to allow more location points for tracking an individual. In some embodiments, the location tag may not transmit a tag signal until triggered by the proximity interrogator 223. In some embodiments the Location tag 202 may be triggered when the location tag 202 moves near (e.g., within communication proximity to) a proximity interrogator 223. In some embodiments, the location tag may be triggered when the proximity interrogator 223 moves near to the location tag 202.

In other embodiments, the location tag 202 may be triggered when a button is pressed or a switch is activated on the proximity interrogator 223 or on the location tag itself. For example, a proximity interrogator 223 could be placed at the start line of a racetrack. Every time a car passes the start line, a car-mounted location tag 202 senses the signal from the proximity interrogator and is triggered to transmit a tag signal indicating that a lap has been completed. As another example, a proximity interrogator 223 could be placed at a Gatorade cooler. Each time a player or other participant fills a cup from the cooler a participant-mounted location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up a participant (e.g., a player) and move him/her to the locker room, a participant-mounted location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, it may generate and store a sensor-individual correlator for association with environmental measurements taken in connection with a specific individual. For example, in one embodiment, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-individual correlator as discussed above. The sensor receiver 166 may associate some or all of the data from the sensor information packets with other stored data in the sensor receiver 166 or with data stored or received from other sensors, diagnostic devices, location tags 102, or reference tags. The sensor receiver 166 transmits a sensor receiver signal to a receiver hub/locate engine 108.

Another type of sensor shown in FIG. 3E is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner comprises one or more cameras or image-analyzers that receive emitted or reflected light or heat, and then analyzes the received images to determine the location of an individual or sensor. Although a triangulation positioner may transmit data wirelessly, it is not a Location tag because it does not transmit blink data or a tag signal that can be used by a receiver hub/locate engine 108 to calculate location. In contrast, a triangulation positioner senses position and computes a position calculation that may then be used as environmental measurements by the receiver hub/locate engine 108.

In one embodiment, a triangulation positioner could be combined with a Location tag or reference tag (not shown). In such embodiments, the triangulation positioner could compute and transmit its position calculation via the Location tag to one or more receivers. However, the receiver hub/locate engine would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector may be stored locally at the proximity detector 253 as shown and transmitted as environmental measurements via one or more sensor information packets to a sensor receiver 166.

In some embodiments, a proximity detector 253 may have a defined position, which is often stationary, and may be associated with a location in the monitored area 100 of FIG. 1. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 106, 166, the receiver hub/locate engine 108, and/or other components of the receiver processing and analytics system 110. In embodiments where the proximity detector is movable, a position calculation could be determined with a triangulation positioner, or the proximity detector could be combined with a location tag and located by the receiver hub/locate engine 108. While shown as separate fields for illustration purposes in FIG. 3E, identify information and position calculation could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to where it is needed. For example, a proximity detector 253 could be located on a medical cart, first down marker, a diagnostic device, goal post, or carried by a paramedic or security guard. In an embodiment where the proximity detector 253 is movable it would typically be associated with a location tag or triangulation positioner so that location (for a location tag) or position (for a triangulation positioner) can be determined at the time identity is sensed.

In the embodiment where the proximity detector includes a Location tag, the receiver hub/locate engine 108 would locate the associated Location tag, and the tag data/sensor data filter 112 would associate the tag location data for the associated location tag as the position of the proximity detector, while determining the identity of an associated individual from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub/locate engine 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub/locate engine 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, $I^2C$, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203), diagnostic devices 233, location tags 102, or RF reference tags 104. Such associated data is referred to herein as "associated sensor data". In the depicted embodiment, the sensor receiver 166' is configured to transmit some or all of the received sensor information packets and any associated sensor data to the receiver hub/locate engine 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub/locate engine 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub/locate engine 108. In another embodiment, the sensor receiver could determine a first time measurement associated with the first sensor information packet and a second time measurement associated with the second sensor information packet that, in conjunction with the sensor UID, could be used, by the receiver hub/locate engine 108, to associate the first sensor information packet with the second sensor information packet.

In one embodiment, the receiver hub/locate engine 108 receives receiver signals from the receiver 106 and sensor receiver signals from the sensor receivers 166, 166'. In the depicted embodiment, receiver 106 may receive blink data from the location tag 102 and transmits to the receiver hub/locate engine 108 some or all of the blink data, perhaps with additional time measurements or signal measurements. In some embodiments, time measurements or signal measurements may be based on a tag signal received from a RF reference tag (e.g., reference tag 104 of FIG. 1). The receiver hub/locate engine 108 collects the blink data, time measurements (e.g. time of arrival, time difference of arrival, phase), and/or signal measurements (e. g. signal strength, signal direction, signal polarization, signal phase) from the receivers 106 and computes tag location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub/locate engine 108 may also access stored data or clock data from local storage and from a network location. The receiver hub/locate engine 108 uses this information to determine tag location data for each Location tag. It may also associate data derived or extracted from tag signals transmitted from one or more location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub/locate engine 108. Any RTLS system using location tags, including those described herein, could require considerable processing by the receiver hub/locate engine 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted location tag 202 is used to convey (sometimes called backhaul) sensor information packets to a receiver 106. In some embodiments, while not shown, multiple sensors 203 may transmit sensor signals carrying sensor information packets to location tag 202. Such received sensor information packets may be associated with blink data that is transmitted to receiver 106.

In one embodiment, the receiver hub/locate engine 108 may parse sensor information packets from received tag data packets and associate such sensor information packets with the location tag 202 that transmitted the sensor information packet. Thus, the receiver hub/locate engine 108 may be able to determine tag location data, which may comprise a location and other data (e.g., tag data, tag UID, tag-individual correlator, sensor-individual correlator, additional stored sensor data, environmental measurements, tag-sensor correlator, identity information, position calculation, etc.) from one or more tags or sensors. Such data and information may be transmitted to the receiver processing and analytics system 110.

In some embodiments, once the receiver hub/locate engine 108 determines a location estimate of a location tag 102 at the time epoch of the tag signal, the receiver hub/locate engine 108 can also associate a location estimate with the tag data packet included in the blink data of such tag signal. In some embodiments, the location estimate of the tag signal may be used as tag location data for the tag data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub/locate engine 108 could parse the position calculation and use it to refine a location estimate for the tag data packet.

Preferably, the receiver hub/locate engine 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub/locate engine 108 may associate an individual with a sensor information packet received from a sensor, and/or may associate an individual with such sensor. Because the receiver hub/locate engine 108 may associate a sensor position estimate with a sensor information packet, the receiver hub/locate engine 108 may also estimate an individual position for the associated individual.

In another embodiment, by comparing data accessed using a tag-sensor correlator, the receiver hub/locate engine 108 may associate a sensor with a tag data packet received from a location tag 102. Because the receiver hub/locate engine 108 may associate a location estimate with a tag data packet, the receiver hub/locate engine 108 may also create a sensor location estimate for the associated sensor. By comparing a location estimate for a location tag with a sensor location estimate or a sensor position estimate, the receiver hub/locate engine 108 may associate a location tag with a sensor, or may associate a tag data packet with a sensor information packet. The receiver hub/locate engine 108 could also determine a new or refined tag-sensor correlator based on this association.

In still another embodiment, by comparing a location estimate for a Location tag with an individual location estimate or an individual position estimate, the receiver hub/locate engine 108 may associate a location tag with an individual, or may associate a tag data packet with an individual. The receiver hub/locate engine 108 could also determine a new or refined tag-individual correlator based on this association.

In one embodiment, by comparing a location estimate for a sensor with an individual location estimate or an individual position estimate, the receiver hub/locate engine 108 may associate a sensor with an individual, or may associate a sensor information packet with an individual. The receiver hub/locate engine 108 could also determine a new or refined sensor-individual correlator based on this association.

Data derived or extracted from tag signals transmitted from one or more location tags is referred to herein as "tag derived data" and shall include, without limitation, tag data, tag UID, tag-individual correlator, tag-sensor correlator, tag data packets, blink data, time measurements (e.g. time of arrival, time difference of arrival, phase), signal measurements (e. g., signal strength, signal direction, signal polarization, signal phase) and tag location data (e.g., including tag location estimates). Tag derived data is not derived by the location tag, but rather, is derived from information transmitted by the location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Data derived or extracted from stored individual data is referred to herein as "individual profile information", "participant profile information", or simply "profile information" and shall include, without limitation tag-individual correlator, sensor-individual correlator, identity information, name, uniform number and team, biometric data, tag position on individual. In various embodiments, the receiver hub/locate engine 108 may transmit tag derived data, sensor derived data, individual profile information, various combinations thereof, and/or any information from the GIS, the field database, the monitored area database, and the individual database to the receiver processing and analytics system 110.

Example Receiver Hub and Receiver Processing and Distribution System

Figure 4:
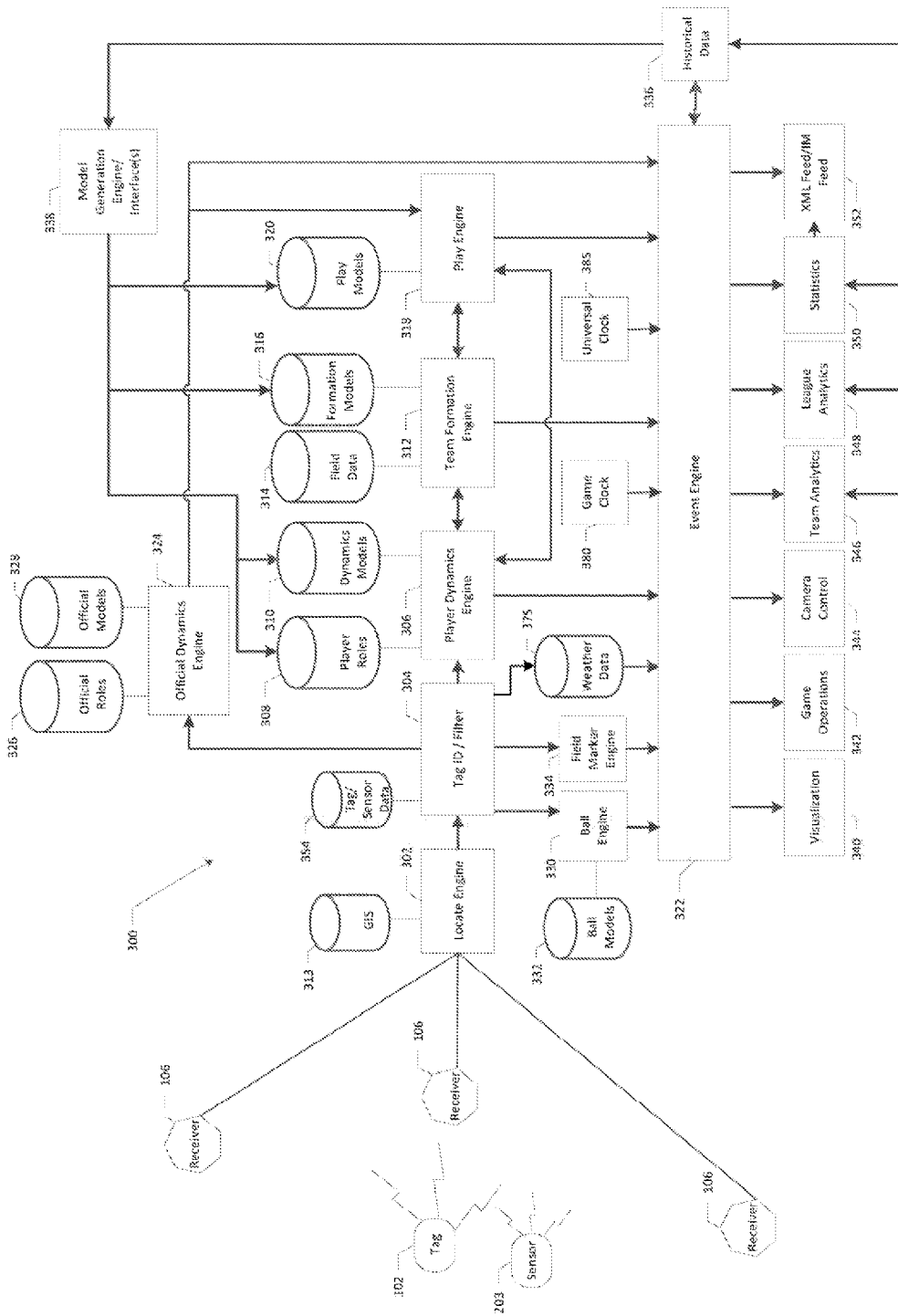
FIG. 4 illustrates an exemplary system for providing performance analytics in accordance with some embodiments of the present invention.

FIG. 4 illustrates an exemplary system 300 for providing performance analytics in accordance with some embodiments of the present invention. The depicted performance analytics system 300 may be distributed in a receiver hub 108 and a receiver processing and distribution system 110 of the type depicted in FIG. 1. For example, locate engine 302 may be part of the receiver hub 108 with the tag ID/Filter 304 through event engine 322 forming part of the receiver processing and distribution system 110. In alternative embodiments, the performance analytics system 300 may be housed or located in a single housing or unit. In still other embodiments, the performance analytics system 300 may be distributed among multiple additional housings or units depending upon the application and other design parameters that will be apparent to one of ordinary skill in the art in view of this disclosure.

The performance analytics system 300 of FIG. 4 may include a plurality of tags 102, and optional sensors 203, associated with participants (e.g., players, officials, balls, field markers, etc.), a plurality of receivers 106 positioned within a monitored environment, a receiver hub/locate engine 302, one or more filters 304, a plurality of databases, a plurality of processing engines, and a plurality of output systems. While only one type of receiver 106, other types of receivers, e.g., sensor receivers 166, 166' of FIG. 3E, may be used in accordance with the embodiments illustrated by FIG. 4. The one or more databases may include databases for tag identifiers 354, player roles 308, player dynamics or kinetics models 310, GIS data or a GIS database 313, field data or a field knowledge database 314, formation models 316, play models 320, official roles 326, official models 328, ball models 332, weather data 375, and the like. The plurality of processing engines may include a player dynamics engine 306, a team formation engine 312, a play engine 318, an event engine 322, an official dynamics engine 324, a field marker engine 334, a ball engine 330, and a model generation engine 338, or the like. The system 300 may further include a game clock 380 and a universal clock 385.

In an exemplary performance analytics system 300, such as illustrated in FIG. 4, the plurality of tags 102 (and sensors 203) may be attached to a participant as discussed in connection with FIGS. 2A-C. In some embodiments, the plurality of tags 102 and/or sensors 203 may be activated and deactivated as needed, such as before and after a game or when damaged or to replace batteries, power suppliers, local memory, etc. Each of the tags 102 may transmit a tag signal, which may include tag derived data, which is received by one or more of the receivers 106. In some embodiments, the receivers 106 may be configured with appropriate RF filters, such as to filter out potentially interfering signals or reflections proximate the field of play or other environment to be monitored.

Each of the receivers 106 may receive tag derived data from the tags 102 and transmit the tag derived data to the receiver hub/locate engine 302. The receiver hub/locate engine 302 collects the tag derived data from the receivers 106 and computes tag location data (based on the blink data) for the tags 102 as discussed above in connection with FIG. 1.

In the depicted embodiment, each of the receivers 106 receives sensor derived data from sensor signals transmitted by sensors 203. In other embodiments, sensor receivers (e.g., sensor receivers 166, 166' of FIG. 3E) may transmit sensor signals comprising sensor derived data to the receiver hub/locate engine 302.

The tag location data, tag derived data, and sensor derived data may be provided from the receiver hub/locate engine 302 to a tag ID/filter 304 that determines the type of participant associated with each received unique tag ID (and/or sensor ID) and routes the associated tag derived data (and optionally, other received tag/sensor derived data) to one or more engines associated with such participant type (e.g., player, ball, official, field marker, etc.). In one embodiment, the tag ID/filter 304 performs this routing, at least in part, by correlating the received unique tag ID (and/or sensor ID) to profile data or prior correlations (i.e., tag ID No. 0047 is correlated to participant John Smith—quarterback, sensor ID No. 12459 is correlated to Marcus Henderson—official, etc.) that may be stored to a tag/sensor identification database 354 (i.e., tag-individual correlators, sensor-individual correlators, tag-sensor correlators, etc.). In some embodiments, the receivers 106 may also receive sensor derived data for other sensors 203, such as through the tags 102 or through separate transmission means.

In one embodiment, perhaps in connection with the player illustration of FIG. 2A, the tag ID/filter 304 identifies tag location data associated with a player and thus routes such data to a player dynamics engine 306 for further processing. The player dynamics engine 306 is disposed in communication with a player role database 308, which comprises player role data correlating tag and sensor UIDs to player profiles (e.g., individual profile information) including, without limitation, which roles (e.g., quarterback, running back, flanker, slot receiver, tight end, left tackle, left guard, center, right guard, right tackle, defensive end, defensive tackle, nose tackle, inside linebacker, outside linebacker, free safety, strong safety, cornerback kicker, punter, etc.) the players perform during a game.

The player dynamics engine 306 may also be disposed in communication with a dynamics/kinetics model database 310. The player dynamics engine 306 may compare the tag location data, other tag and sensor derived data, and player role data to player dynamics/kinetics models to determine aspects of the player dynamics or movement kinetics. The dynamics/kinetics model database 310 may comprise models of different aspects or dimensions that may be based on past player location data or other data generated by the model generation engine 338 as discussed below. The models may include, without limitation, models for a particular player profile (e.g., John Smith), a player type (e.g., quarterback), a player type for a particular team (e.g., a quarterback from the Chicago Wizards), a player type for a particular formation (e.g., a quarterback in a spread offense), and the like. Such models may consider all three dimensions (x, y, z) of the tag location data for each tag (e.g., 102 of FIG. 2A) and may further consider different tag position arrays (e.g., two tag implementations—one proximate each shoulder as in FIG. 2A, eleven tag implementations—one proximate each shoulder, one proximate each elbow, one proximate each hand, one proximate each knee, one proximate each foot, and one proximate the head).

In one embodiment, the player dynamics engine 306 determines a multi-dimensional player location per unit time (e.g., participant location data) for each player based on the tag location data, other tag and sensor derived data, the player role data, and the player dynamics/kinetics models. Such multi-dimensional player location may include relative location of the player relative to the field of play, and/or general orientation of the player (e.g., standing, squatting, laying the ground, sitting, etc.) such as by correlating location data and other tag and sensor derived data.

The player dynamics engine 306 uses the real time tag location data stream from the locate engine 302, as well as the player role database 308 to provide accurate information about what a particular player is doing in real time (or near real time). The player dynamics engine 306 may further use other tag and sensor derived data, received from the locate engine 302 in the depicted embodiment, to aid in determining not only where the player is, but also how that player's location is changing with time, velocity, acceleration, deceleration, orientation, or the like. The player dynamics engine 306 outputs multi-dimensional player location information per unit time (e.g., participant location data).

In one embodiment, sensor derived data may comprise accelerometer data that may indicate that a player (or portion of a player) is accelerating or decelerating. In addition to the variety of other uses that will be apparent to one of ordinary skill in the art in view of this disclosure, the accelerometer data may be used to improve location accuracy for the system. For example, in circumstances where the real time tag location data stream erroneously suggests (perhaps due to interference, multipath effects, signal reflections, signal losses due to line-of-sight blockages, etc.) that one of the possible locations for the player is 10 feet away from a prior location, the accelerometer data could be used to confirm that the player (or accelerometer affixed portion of the player) did not experience an acceleration sufficient to move that distance in the amount of time provided.

In some embodiments, sensor derived data may comprise time-of-flight sensor data, which may indicate distances between participants (e.g., distance of a player to other players, officials, the ball, etc.) or other objects. In applications involving complex tagged object movements such as, the example football application discussed herein, time-of-flight sensor data may be used to enhance the location accuracy of the system especially in circumstances where one or more tags or sensors are temporally unable to effectively transmit their data to one or more receivers. For example, in one embodiment, a tag positioned within the ball may appear to the system as not moving because the running back carrying the ball has run into a group of other players and the bodies of such other players are actually blocking the line-of-sight transmissions of the ball tag. In this embodiment, time-of-flight sensors positioned on the group of other players may be repeatedly determining and transmitting to one or more receivers the relative distance between such time-of-flight sensors and the ball or ball carrier. In this regard, the system may determine that the ball is no longer at the ten yard line (i.e., the point where the system last received a transmission directly from the ball tag) but rather has advanced toward the opponent's end zone to the six yard line. This and other similar techniques may be used alone or in combination with other tag and sensor derived data (e.g., accelerometer data, etc.) to create a type of mesh network that may adapt to temporary or sustained line-of-sight blockages and improve the accuracy of location determinations, formation determinations, play determinations, etc.

In some embodiments, the player dynamics engine 306 outputs multi-dimensional player location information per unit time to an event engine 322. In some embodiments, the multi-dimensional player location information may include a ranked or weighted list of probable player locations while, in other embodiments, the multi-dimensional player location information includes only a top, or most probable, player location. This information may be used by the event engine 322 to determine a number of important player events. For example, the multi-dimensional player location information may be used to indicate that a player was tackled (i.e., experienced a rapid deceleration and transited from a standing to a laying position) and is subsequently limping (e.g., tag and/or sensor data from tags/sensors proximate the players feet indicate a change in the gait of the player). In such example, the event engine 322 may be configured to transmit an alert (e.g., via text message, email, or the like) to an athletic trainer to have the player checked-out or treated.

The player dynamics engine 306 may further output the multi-dimensional player location information per unit time (e.g., participant location data) to a team formation engine 312. The team formation engine 312 is disposed in communication with a formation models database 316 that contains models of various formations (e.g., offensive formations, defensive formations, special teams formations, etc.) defined for the relevant sport or activity (e.g., football in the depicted embodiment). The models of various formations may be derived from multi-dimensional player location information collected during prior games, practices, etc., (e.g., learned by the system) or as input by one or more teams, such as by using model generation engine 338, historical data store 336, and/or team analytics engine 346.

The team formation engine 312 is further disposed in communication with a field data database 314 to assist in determining the likely team formations. The field data database 314 may comprise, without limitation, survey data for the field (e.g., various distances or coordinates from reference tag(s) or other marker to yard lines, end zones, goal posts, boundaries, benches, locker rooms, spectator areas, other zones of interest, etc.).

In one embodiment, the team formation engine 312 determines one or more formations (e.g., a probable formation or a ranked or weighted list of probable formations) based at least in part on the field data, the multi-dimensional player location information (which may include the tag derived data and/or sensor derived data), and the formation models. The team formation engine 312 may hypothesize the received multi-dimensional player location data against models of every known formation to determine a probable formation or a ranked or weighted list of probable formations. The team formation engine 312 is thus configured to determine and output a data stream of formations versus time, which considers how various formations change and may be used by downstream engines to determine various events including the occurrence of a play.

In one embodiment, the team formation engine 312 may assign weights to the received multi-dimensional player location data (i.e., participant location data), other types of tag derived data and/or sensor derived data, and/or to the formation models when determining a specific formation or ranked list of probable formations. For example, in one embodiment, the team formation engine 312 may be configured to assign a greater weight to the position of the ball (which should remain stationary for a period of time as formations are being established, i.e., at the beginning of a play) than to the position of an official (which may move to some degree as formations are forming). In another embodiment, the team formation engine 312 may be configured to assign a greater weight to the location of the tight-end (which may indicate the strong side of a formation) than to the location of a left guard (whose location seldom effects formation determination). In still another embodiment, the team formation engine 312 may be configured to assign a greater weight to sensor derived data associated with an accelerometer positioned proximate an official's wrist (which may indicate winding of the play clock that often triggers the period during which formations ought to be forming) than to the location of any player.

In one embodiment, the team formation engine 312 outputs the data stream of formations versus time (e.g., formation data) to the play engine 318. The play engine 318 may also receive the output data stream (e.g., multi-dimensional player location information versus time) from the player dynamics engine 306. The play engine 318 is disposed in communication with a play models database 320. The play models database 320 may include play models (e.g., known formation shifts or movements over time). Such play models may be programmatically learned by the system (e.g., based on actual movements of players tracked by the system) or manually entered through an interface or other tool (e.g., perhaps through the model generation engine 338). In this regard, the play models database 320 may include historical plays executed by teams, potential/future plays from a team game plan or playbook, or other historical data (e.g., from historical data store 336).

In one embodiment, the play engine 318 may take the formations versus time data stream from the formation engine 312, the play models, and the player dynamics data stream (which may include tag location data and/or other tag and sensor derived data) to determine whether a play is forming, a play has started, a play is in progress, or a play has ended. For example, the play engine 318 may determine that it is most likely that a pre-snap formation at the line of scrimmage has occurred (e.g., an offensive team has aligned in a "pro set" formation and a defensive team has aligned in a "3-4" formation) indicating a play is about to begin. The play engine 318 may thereafter determine that the offensive and defensive players have begun rapidly accelerating towards and across a line of scrimmage thereby indicating that a play has begun. The play engine may further determine that an offensive player has been tackled by a defensive player thereby indicating that a play has concluded.

In some embodiments, the play engine 318 may use assigned weights (or assign weights) to the received data (e.g., the tag derived data, the sensor derived data, the multi-dimensional player location data, the formations data, officials data, etc.) for use in analyzing the data and determining the most probable play events. For example, the play engine 318 may determine that data for particular participants (e.g., a left guard) has a lower relevance for a particular formation (e.g., a pro set offensive formation) and assign a lower weight to that data during the analysis than to another participant (e.g., the ball, the quarterback, a wide receiver, etc.).

In some embodiments, the play engine 318 is disposed in communication with an official dynamics engine 324 to further improve the play determination accuracy of the system. The official dynamics engine 324 may provide data about the movements, actions, positions of an official, which the play engine 318 may use when determining a probable play and/or the status of a play. For example, as discussed in connection with FIG. 2B above, an official may be provided with wrist based accelerometers or other sensors (e.g., a whistle sensor), which may be used to flag the beginning or ending of a given play based on the movement or action of an official (e.g., rotating an arm to wind the play clock, indicate touchdown with two arms raised, blow a whistle, etc.).

The play engine 318 may analyze how the team formations occur and how they break up to determine both start and stop of a play (e.g., start of play event, end of play event, etc.). For example, the play engine 318 may determine that offensive and defensive formations coalesced proximate a line of scrimmage and then broke up with various receivers heading towards the defensive team's end zone, there was all kinds of activity around a quarterback which eventually dissipated, and that defense players were tracking one of the receivers downfield until the receiver crossed into the end zone and an official raised his arms. The play engine 318 may determine that this participant activity best fits a play model whereby a ball was thrown and caught by a receiver who then scored a touchdown thereby ending the play.

In some embodiments, the play engine 318 may hypothesize the received multi-dimensional player location data (e.g., participant location data) and the data stream of formations versus time against models of every known play to determine a probable play or a ranked list of probable plays. The play engine 318 is thus configured to determine and output a data stream of plays versus time, which may be communicated to the event engine 322.

In some embodiments, the tag ID/filter 304 may determine that received tag derived data and/or sensor derived data corresponds to one or more officials. Such official correlated tag/sensor derived data is routed to the official dynamics engine 324. The official dynamics engine 324 is disposed in communication with an official roles database 326, which comprises official roles data correlating tag and sensor IDs (or other tag/sensor individual correlators) to official profiles including, without limitation, which roles (e.g., referee, umpire, head linesman, line judge, back judge, field judge, side judge, etc.) the officials perform during a game.

The official dynamics engine 324 may also be disposed in communication with a dynamics/kinetics model database 328. The official dynamics engine 324 may compare the tag location data, other tag/sensor derived data, and official role data to official dynamics/kinetics models to determine aspects of the official dynamics or movement kinetics. The dynamics/kinetics model database 328 may comprise models of different aspects or dimensions that may be based on past official location data or other data generated by the model generation engine 338 as discussed below. The models may include, without limitation, models for a particular official profile (e.g., Ralph Stevens), an official type (e.g., referee), an official type for a particular formation (e.g., a referee positioned during a kickoff), and the like. Such models may consider all three dimensions (x, y, z) of the tag location data for each tag (e.g., 102 of FIG. 2B) and may further consider different tag position arrays (e.g., two tag implementations—one proximate each shoulder as in FIG. 2B, eleven tag implementations—one proximate each shoulder, one proximate each elbow, one proximate each hand, one proximate each knee, one proximate each foot, and one proximate the head).

In one embodiment, the official dynamics engine 324 determines a multi-dimensional official location per unit time for each official based on the tag location data, other tag and sensor derived data, the official role data, and the official dynamics/kinetics models. Such multi-dimensional official location may include (1) a relative location of the official relative to the field of play, (2) a general orientation of the official (e.g., standing, squatting, laying the ground, sitting, etc.), and (3) a specific orientation of the official (e.g., arms raised, arms at hips, one hand grasping the wrist of the other arm, etc.).

The official dynamics engine 324 uses the real time tag location data stream from the locate engine 302, as well as the official role database 326 to provide accurate information about what a particular official is doing in real time (or near real time). The official dynamics engine 324 may further use tag and sensor derived data, received from the locate engine 302 in the depicted embodiment, to aid in determining not only where the official is, but also how that official's location is changing with time, velocity, acceleration, deceleration, orientation, or the like. For example, in one embodiment, the sensor derived data may comprise accelerometer data that may indicate that an official (or portion of an official) is accelerating or decelerating. The official dynamics engine 324 outputs multi-dimensional official location information per unit time. Such multi-dimensional official location information may include information regarding the official's location, how the location is changing with time, orientation of the official, motions or gestures of the official, or the like.

In some embodiments, the tag ID/filter 304 may determine that received tag and/or sensor derived data corresponds to the game ball (e.g., a ball such as the ball shown in FIG. 2C, which is used or capable of use in the field of play). Such ball correlated tag/sensor derived data is routed to the ball dynamics engine 330. While the ball engine 330 is not shown in communication with a "roles" database as in the case of some of the other processing engines, one of ordinary skill in the art will readily appreciate some ball role data may be used, such as a ball ID or the like, indicating that the received tag/sensor derived data is associated with a given ball.

The ball engine 330 may access a ball models database 332, which comprises data indicating how location data and other tag and sensor derived data correlates to particular ball events during play. The ball engine 330 may provide information regarding the ball's position/location (vertical and/or horizontal), how the location is changing with time, the velocity of the ball, the rotation of the ball, or the like for determining events during play. The ball engine 330 may output ball data streams to the event engine 322. In some embodiments, although not shown in FIG. 3, the ball engine may also output a data stream to other processing engines for analysis, such as to the play engine 318 for use in determining status of a play.

In some embodiments, the tag ID/filter 304 may determine that received tag and/or sensor derived data corresponds to a field marker (e.g., penalty flags, line of scrimmage markers, yards to gain markers, and the like). The tag ID/filter may then route such field marker correlated tag/sensor derived data to a field marker engine 334 for further processing. The field marker engine 334 may provide information regarding field marker location, how the location is changing with time, or the like, for determining events during play. The field marker engine 334 may output data streams to the event engine 322. In some embodiments, although not shown in FIG. 3, the field marker engine may also output a data stream to other processing engines for analysis, such as to the play engine 318 for use in determining the status of a play.

In some embodiments, a game clock 380 may be provided that is configured to keep an official time for a game or other tracked activity. In applications such as the depicted football application, the game clock is configured to count down from some standard period or quarter length (e.g., 15 minutes) and may be periodically stopped or started by one or more officials and/or the game operations system 342 as discussed in greater detailed below. While not separately illustrated in FIG. 3, the game clock 380 may further include a play clock, shot clock, pitch clock, or the like, which depending upon the application, may also be started and stopped by one or more officials and/or the game operations system 342.

The universal clock 385 provides a system time for the performance and analytics system 300. As will be apparent to one of ordinary skill in the art in view of this disclosure, the universal clock 385 is running clock for tracking, cataloging, and calibrating system actions, processes, and events. For illustrations purposes, the game clock 380 and the universal clock are shown as inputs for the event engine 322; however, in other embodiments, such clocks may provide inputs to any or all of the player dynamics engine 306, the team formation engine 312, the play engine 318, the event engine 322, the official dynamics engine 324, the field marker engine 334, the ball engine 330, and the model generation engine 338.

An event engine 322 may receive the outputs from the player dynamics engine 306, the team formation engine 312, the play engine 318, the official dynamics engine 324, the ball engine 330, the field marker engine 334, the weather data store 375, a game clock 380, and a universal clock 385 to determine events occurring during game play or to perform analytics, including predictive analytics, on game related data. In some embodiments, the event engine 322 determines such events and performs such analytics by comparing its received inputs to a historic data store 336 containing past events or analytics. In some embodiments, the event engine 322 outputs event data streams (e.g., one or more output events) to a number of systems including, without limitation, a visualization system 340, a game operations system 342, a camera control system 344, a team analytics system 346, a league analytics system 348, a statistics system 350, an XML feed and/or instant message feed 352, a historical data store/engine 336, or other systems as may be apparent to one of ordinary skill in the art in view of this disclosure.

In some embodiments, the event engine 322 may output event data streams that include the time delay between tag and/or sensor transmissions and the determination of the events such that other processes, such as a visualization system, game operations system, etc., may properly correlate to different inputs (e.g., video recording versus the determined events) so that the different inputs are synchronized. In other embodiments, the event data streams may include time stamps (game time stamp, universal time stamp, etc.) for determined events or other system processes. In this way, the performance and analytics system 300 or some downstream system can determine, inter alia, which events or processes occurred in-game (i.e., during a running game or play clock) or out-of-game (i.e., while the game or play clock were stopped).

In various embodiments, the event data streams or output events provided by the event engine may include tag events (e.g., battery low indication, error indication, etc.), sensor events (e.g., battery low indication, error indication, etc.), locate engine events (e.g., status indications, error indications), tag ID/Filter events (e.g., status indications, error indications), player dynamics engine events (e.g., status indications, error indications), player events (e.g., player tackled indication, player injured indication, etc.), official dynamics engine events (e.g., status indications, error indications), official events (e.g., official injured indication, etc.), ball engine events (e.g., status indications, error indications), ball events (e.g., new ball required indication, etc.), team formation engine events (e.g., status indications, error indications), team formation events (e.g., formation type indication, new formation indication, illegal formation indication, etc.), play engine events (e.g., status indications, error indications), play events (e.g., play type indications such as run, pass, punt, field goal, etc., play results, and in-play or sub-play events such as bootleg, 3 step drop, 5 step drop, 7 step drop, crossing pattern, hook pattern, fly pattern, drive block, pass block, spin move, swim move, press coverage, zone coverage, etc.), or any other events that may be apparent to one of ordinary skill in the art in view of this disclosure. A variety of additional event data streams or output events are described in connection with the analytics systems and control systems discussed below.

In one embodiment, the event engine 322 outputs an event data stream to the visualization system 340 that may be used by the visualization system to provide enhanced telecasts or game experiences for television broadcasts, streaming mobile device clients, and other media outlets, gaming systems, and other computer graphics visualization systems. Such event data streams may be used to provide enhanced graphics, displays, information, visualizations, and the like. For example, and without limitation, the visualization system 340 may receive real time (or near real time) data including, without limitation, player ID, official ID, team ID, formation identifiers, play identifiers, pre-snap play probabilities, play diagrams, player route data, player speed data, player acceleration data, ball route date, ball speed data, ball acceleration data, player trend information, offensive team trend information, defensive team trend information, special teams trend information, and other tag and/or sensor derived data. In some embodiments, the visualization system 340 may be configured to provide a dynamically configurable interface that may be engaged by a user to select graphics or areas of focus. For example, in one embodiment, a user may configure the system to display possible passing lanes for a quarterback to his eligible receivers. In still other embodiments, the visualization system 340 may output a data stream for use in gaming systems, such as plays, player actions, or the like.

In gaming systems examples, the visualization system 340 may provide output of event data that may be configured for display via a gaming console or handheld device. Such visualization system outputs may, for example, provide for incorporating actual or predicted actions of a "live" player into a gaming environment. In some embodiments, the visualization system may also access stored computer generated or user created avatars for use with the event data stream.

In one embodiment, the event engine 322 outputs an event data stream to the game operations system 342 that may be used by the game operations system to coordinate, manage, or assist in the coordination or managing of game operations including, without limitation, the game clock 380 (and optionally the play clock), down and distance determination, score board operations, penalty enforcement, and the like. For example, and without limitation, the game operations system 342 may receive real time (or near real time) data from the event engine 322 including, without limitation, a clock start indication, a clock stop indication, a play start indication, a play end indication, a reset play clock indication, a 1$^{st}$ down indication, a 2$^{nd}$ down indication, a 3$^{rd}$ down indication, a 4$^{th}$ down indication, a turnover indication, a yard to gain indication, a 5 yard penalty indication, a 10 yard penalty indication, a 15 yard penalty indication, an end of quarter indication, an end of half indication, and an end of game indication.

Said differently, the event engine 322 may determine a number of events that may be output to the game operations system or other devices. Such events may include, without limitation, a ready for play event (e.g., an official has spotted the ball at the line of scrimmage and started a play clock in a football example, a pitcher has received the ball from his catcher in a baseball example, or the pins have been set in a bowling example), a start of play event (e.g., the ball has been snapped in a football example, the pitcher has begun his pitching motion or wind-up in a baseball example, or a bowler has begun his bowling motion in a bowling example), and an end of play event (e.g., the official has blown a whistle in a football example, an umpire has called a third strike in a baseball example, or the nine pins have been knocked down in a bowling example). Such events may be used to determine plays, formations, and to output play diagrams (e.g., graphs or plots of participant location versus time from a start of play event to an end of play event).

The event engine 322 may be further configured to output a play result to the game operations system 342 or other device. Such play results may include, for example and without limitation, a gain of twelve yards, a loss of three yards, an interception, a touchdown, a first down, and the like in football embodiments; a ball, a strike, a fly-out, a single, a double, a home run, a run scored, and the like in baseball embodiments; and a gutter, a strike, a spare, and the like in bowling embodiments.

As would be apparent to one of skill in the art, the various engines and/or output systems may include security measures, such as encryption, access permissions, and the like, to secure system inputs and outputs. In some embodiments, the engines and/or output systems may comprise security measures to prevent hacking, jamming, transmission interception, etc. to prevent interference from outside parties, such as third parties attempting to gain information that may be advantageous in wagering, for example.

In one embodiment, the event engine 322 outputs an event data stream to the camera control system 344 that may be used by the camera control system to engage or transition engagement between one or more television, film, or other cameras to capture game events. For example, and without limitation, the camera control system 344 may receive real time (or near real time) data including, without limitation, an engage or disengage camera 1 indication, an engage or disengage camera 2 indication, an engage or disengage camera 3, . . . and an engage or disengage camera n indication. In some embodiments, the event engine 322 may output camera control indications (e.g., event data) based on real time (or near real time) game activity (e.g., ball location data suggests that the ball is closest to a known field of view for camera 4 and, thus, an engage camera 4 indication is transmitted to the camera control system 344). In other embodiments, the event engine 322 may output camera control indications (e.g., event data) based in part on a prediction of game activity (e.g., ball position, acceleration, and direction data suggests that the ball has just left the quarterback's hand and is being passed along a direction and at a velocity indicative of being caught in the field of view of camera 4 and, thus, an engage camera 3 indication is transmitted to the camera control system 344). In other embodiments, the camera control system 344 may provide indications such as to tilt, pan, or zoom in connection with a particular camera based on event data or predicted actions, or set a location or point of view based on where a player, formation, or play may be best viewed.

In one embodiment, the event engine 322 outputs an event data stream to the team analytics engine 346 that may be used to generate real time (or near real time) analytics (e.g., player performance information, formation performance information, play performance information, and team performance information) concerning game activity that may be useful to individual teams. For example, in one embodiment, the team analytics engine 346 may use event data to determine actual game performance versus playbook design including, without limitation, an evaluation of player routes, offensive, defensive, and special teams formations, offensive blocking protection schemes, defensive blitzing schemes, and the like.

In another embodiment, the team analytics engine 346 may use event data to determine actual game performance versus historical game performance (such as by using historical data store 336) including, without limitation, an evaluation of game performance (e.g., player, team, offense, defense, special teams, etc.) versus prior year performance, prior game performance, prior quarter performance, prior possession performance, prior play performance, and the like. In this regard, as will be apparent to one of ordinary skill in the art, the team analytics engine 346 may be used to evaluate performance (e.g., the left tackle has missed three assignments), identify trends (e.g., the defensive team consistently sends a linebacker blitz against a spread offensive formation), make player substitutions (e.g., a second string left tackle has performed better historically against the right end of the defense and thus should be substituted for the starting left tackle), revise game plans, or provide alerts (e.g., the flanker has experienced significantly reduced speed, acceleration, and performance following being tackled and thus an alert should be generated to the training staff to ensure that such player is medically evaluated).

For example, in one embodiment, a trainer may have a device, such as a handheld device, tablet, etc., that may receive alerts regarding a particular player. The trainer may receive background information and/or past information on a player as well as what change the system has identified to cause the alert, such as a change in gait, slower route running, etc. The trainer may then be able to evaluate the player and provide input to the system regarding the player evaluation, such as if further attention is required or if the player can return to play. In some embodiments, such alert and evaluation results may also be provided to the league analysis system, such as for use in determining injury trends or the like.

In some embodiments, the team analytics engine 346 may be used to alert a team (e.g., coaches) to focus on specific players who are performing sub-par versus their normal (historical) performance, such as by plays or by teams. In some embodiments, the team analytics engine 346 may further output analysis results to the historical data store 336 or the like, for use in future analysis and/or the building or updating of various models.

In one embodiment, the performance and analytics system is configured to evaluate player performance by correlating at least one tag to the player; receiving blink data (and other tag derived data) transmitted by the at least one tag; determining tag location data based on the blink data; receiving player role data; comparing the tag location data to player dynamics/kinetics models based at least in part on the player role data; determining player location data based on the comparing the tag location data to the player dynamics/kinetics models; and determining player performance information based on comparing the player location data to stored player location data. In some embodiments, the stored player location data may be stored to the historical data store 336 and may include player location data for the actual player to be evaluated (e.g., Frank Smith, left tackle, #55) and/or player location data for another player (e.g., Fred Johnson, left tackle, #65) who plays a similar position to the actual player to be evaluated. In still other embodiments, the stored player location data may include competitive data based on the performance of the actual player against an opposing player (e.g., the left tackle blocked the right defense end successfully in five prior match-ups, the defensive back caused a delay by the wide receiver of 2 seconds in running a passing route by applying press coverage, etc.).

In another embodiment, the performance and analytics system is configured to evaluate official performance by correlating at least one tag to the official; receiving blink data (and other tag derived data) transmitted by the at least one tag; determining tag location data based on the blink data; receiving official role data; comparing the tag location data to official dynamics/kinetics models based at least in part on the official role data; determining official location data based on the comparing the tag location data to the official dynamics/kinetics models; and determining official performance information based on comparing the official location data to stored official location data. In some embodiments, the stored official location data may be stored to the historical data store 336 and may include official location data for the actual official to be evaluated and/or official location data for another official who held a similar position (e.g., referee, umpire, etc.) to the actual official to be evaluated.

In one embodiment, the event engine 322 outputs an event data stream to the league analytics engine 348 that may be used to generate real time (or near real time) analytics concerning game activity that may be useful to a league (i.e., a collection of teams). For example, in one embodiment, the league analytics engine 348 may use event data to improve game safety by identifying injury trends (e.g., player concussions occur at a higher rate when an offensive team runs crossing passing routes from a spread formation against a 3-4 defense, etc.). In another embodiment, the league analytics engine 348 may use event data to evaluate rule changes (e.g., a rule change intended to speed up game play is or is not achieving its intended result). In still another embodiment, the league analytics engine 348 may use event data to improve officiating (e.g., determining the accuracy of official calls). In some embodiments, the league analytics engine 348 may further output analysis results to the historical data store 336 or the like, for use in future analysis and/or the building or updating of various models.

In one embodiment, the event engine 322 outputs an event data stream to the statistics engine 350 that may be used to generate real time (or near real time) statistics concerning game activity. Such statistics may include, without limitation, offensive statistics (e.g., passing, rushing, receiving, turnovers, touchdowns scored, etc.), defensive statistics (e.g., tackles, sacks, interceptions, turnovers generated, etc.), special teams statistics (e.g., punt length, punt hang time, average return, long return, field goal accuracy, etc.), play diagrams, length of play statistics (e.g., 4.8 second average play, 22 second average pre-snap formation period, etc.), player participation statistics (e.g., John Smith participation in 42 of 68 offensive plays, etc.), summary statistics (e.g., top scorers, fantasy points, minutes on offense, etc.), official statistics (e.g., penalties called, location tracking diagrams per play, etc.) and the like. In some embodiments, the statistics engine 350 may further output statistics and results to the historical data store 336 or the like, for use in future analysis and/or the building or updating of various models.

In some embodiments, the statistics engine 350 may be used to generate real time statistics including those uniquely facilitated by real time location systems structured as described herein. For example, in a football application, the statistics engine 350 may be configured to generate tackle force statistics (e.g., forces applied by a defensive player when tackling a ball carrier), blocking force statistics (e.g., forces applied by an offensive player blocking a defensive player), offensive player grade statistics (e.g., per play grades or scores programmatically determined for each offensive player based on their movements and performance during the play), defensive player grade statistics (e.g., per play grades or scores programmatically determined for each defensive player based on their movements and performance during the play), and special teams player grade statistics (e.g., per play grades or scores programmatically determined for each special teams player based on their movements and performance during the play).

Alternatively or additionally, other example statistics may be generated that relate generally to other aspects of the game or contest. For example, such statistics may include a combination of actual distance traveled and total distance traveled in a vector that is perpendicular to a line of scrimmage. Other examples, may include, but are not limited to statistics that are indicative of a positive/negative event in the game or contest. Such cases may include weighting data in instance in which a participant is in the vicinity of a ball or other relevant object. In further examples, the statistics engine 350 may be configured to process statistical data provided by remote sources, such as third party sources.

In one embodiment, the event engine 322 outputs an event data stream to the XML feed and/or instant messaging feed engine 352 that may be used to generate XML or instant messaging data streams that may include live data such as plays, scoring plays, other scoring info, results, top scorers, summary statistics, or the like.

In one embodiment, the event engine 322 may output an event stream that may be used to annotate or tag a game recording, for example, using visualization system 340, game operations system 342, or the like. For example, in one embodiment, the event engine 322 may flag, tag, or annotate certain events (e.g., plays, penalties, formations, clock start/stop, etc.) into a video recording or live data stream of a game for later playback or analysis. In some embodiments, any event identified by the event engine 322 may be flagged, tagged, or annotated to a video or other data stream to provide for ease of later identification. In this regard, various events may be readily searched, identified, stored to a database in an indexed way, and/or analyzed.

In some embodiments, the event engine 322 may determine events occurring proximate one or more play boundaries. For example, using outputs from the player dynamics engine 306, the ball engine 330, and the official dynamics engine 324 the event engine 322 may determine that a touchdown has been scored (i.e., a player has carried the ball across a goal boundary into the endzone). In particular, the event engine 322 may determine that a running back carried the ball (based on location data received from the ball engine and the player dynamics engine) across the goal boundary (based on field data), which was confirmed by the nearest official signaling touchdown by raising both arms (based on location data received from the official dynamics engine).

In some embodiments, the event engine 322 may output an event data stream to a historical data store/engine 336, which may store data generated by the various processing engines over time. The historical data store/engine 336 may be accessed by various systems, such as for use in providing analytics or generating new models. For example, historical data store/engine 336 may provide historical data to model generation engine 338, which the model generation engine 338 may use in learning (or developing) new play or formation models that should be added to the respective model databases. In some embodiments, the historical data store/engine 336 may be accessed by the analytics and statistics systems to generate more in-depth analytics or statistics. In some embodiments, the historical data store 336 may comprise prior event and tag derived data received by the system for each individual player (e.g., John Smith) and may also comprise player data received from other sources, such as from manual input tools (i.e., such as using a form or template) or external data sources (e.g., other statistics databases, etc.).

In some embodiments, the event engine 322 may output an event data stream that may be used in conjunction with historical results, such as from historical data store 336, for determining odds for outcomes of various team matchups. For example, the event data stream and historical event data may be analyzed to generate and/or change predicted odds for outcomes of each play, etc., which may be used in a wagering system or the like.

In some embodiments, the team analytics system 346 may provide an interface tool (i.e., perhaps through the model generation engine 338) configured to allow a team to input future plays (i.e., a game plan). Such future plays may be tested against historical data stored to the historical data store 336 in order to determine a probability for success. For example, the team analytics system 346 may be configured to allow a team to virtually test an individual play intended to be run from a given offensive formation against defenses that were historically run against such offensive formation. As will be apparent to one of ordinary skill in the art in view of this disclosure, the team analytics system 346 may be configured to allow a team to virtually test its game plan against another team, specific players, specific formations, specific blocking protections, specific blitz packages, specific weather conditions, and the like.

In one embodiment, the team analytics system 346, or any other engine or system, may be configured with access security controls (e.g., password protection schemes, etc.) sufficient to limit access to team proprietary data (e.g., game plan information, player injury data, etc.) to individual teams. In this regard, game integrity may be preserved by ensuring that proprietary data of a first team is not obtained by a competing second team.

In some embodiments, the event engine 322 and its corresponding output systems (i.e., the visualization system 340, the game operations system 342, the camera control system 344, the team analytics system 346, the league analytics system 348, the statistics system 350, the XML feed/IM feed system 352, and the historical data store/engine 336) may be configured to provide different levels of specificity for the output data. For example, an individual team may receive output data breaking down the specific details for each play and the player dynamics for the play, such that the team may determine the performance of each player in executing the specifics of a play versus an intended design. In contrast, similar yet less detailed output may be provided to all teams such as basic play diagrams and standard statistics for the players.

In some embodiments, one or more of the engines shown in FIG. 3, such as, without limitation, the team formation engine, the play engine, the event engine, or the like, may output lists or ranked lists of probable output events (e.g., locations, formations, plays, events, etc.) for display to a user via a graphical user interface (e.g., PC, tablet, mobile device, etc.) and/or for use by downstream engines or systems. In other embodiments, the above described engines may select from the ranked list of probable events a most probable event, or more simply a "probable event" (e.g., probable location, probable formation, probable play, probable blocking technique, probable passing route, etc.), that either has the highest probability indicator among the ranked list or has a probability indicator above a pre-defined threshold.

In some embodiments, the user may validate or confirm an output event (e.g., a location, a formation, a play, or an event) to improve system operation. For example, in one embodiment, the event engine 322 may determine that the following events may have occurred each with a respective probability indicator shown in parenthesis: completed pass—12 yard gain for the offense (68%); completed pass—10 yard gain for the offense (21%); incomplete pass—0 yard gain for the offense (19%). This ranked list may be displayed to an official via a mobile device who may select and confirm the correct output event, which in this example is the completed pass for a 12 yard gain for the offense. In this regard, as will be apparent to one of ordinary skill in the art in view of this disclosure, the system may employ a user to break ties or close calls (e.g., probabilities within 10 percent, etc.) or to improve the accuracy of models, input weighting allocations, and the like.

In still other embodiments, the performance and analytics system may determine or predict participant locations, formations, plays, or other events despite temporary or sustained losses of blink data for one or more tags (e.g., due to transmission failures associated with multipath effects, line-of-sight blockages, etc.). For example, in one embodiment, the performance and analytics system: receives first tag location data for a first participant (e.g., a ball carrier) during a first time period (e.g., an in-play period representing the first 3 seconds of a play); receives subsequent first tag location data for the first participant during a second time period (e.g., a second in-play period representing the second 3 seconds of a play); receives second tag location data for a second participant (e.g., the ball carried by the ball carrier) during the first time period; and determines (or predicts) subsequent second tag location data for the second participant during the second time period based at least on: the first tag location data for the first participant during the first time period, the subsequent first tag location data for the first participant during the second time period, and the second tag location data for the second participant during the first time period.

The above determination or prediction may be further improved using tag derived data and sensor derived data. For example, the performance and analytics system may receive first sensor derived data (e.g., time-of-flight sensor data or other tag and sensor derived data suggestive of a relative proximity between the first participant and the second participant) for the first participant during the first time period; receive subsequent first sensor derived data for the first participant during the second time period; and determine the subsequent second tag location data for the second participant during the second time period further based at least on: the first sensor derived data for the first participant during the first time period, and the subsequent first sensor derived data for the first participant during the second time period.

In still other embodiments, the above determination or prediction of second participant location may be improved by comparing participant location at various times to formation and/or play models. Such comparisons may further include field data, and participant role data. For example, if we maintain the above example whereby the first participant is a ball carrier and the second participant is a ball, the performance and analytics system may determine or predict the location of the ball (i.e., in circumstances where tag or sensor transmissions from the ball are blocked) during a pre-snap period by determining that the ball carrier is aligned in a stationary location in the backfield. By comparing such ball carrier location data to formation models, the system may determine that the ball is most likely positioned at the line of scrimmage proximate the center.

Similarly, in another embodiment, perhaps where the first participant is a quarterback and the second participant is a left guard, the performance and analytics system may determine or predict the location of the left guard in any given play or time period based upon comparing movements of the quarterback to formation and play models. For example, quarterback movement from a snap position to a drop back passing position may be suggestive that the left guard is positioned in a pass blocking position proximate the line of scrimmage. Alternatively, quarterback movement from a snap position to a hand-off position may be suggestive that the left guard is positioned up field of the line of scrimmage in a run blocking position.

Example Fantasy Gaming Embodiments

In an example embodiment, the event engine 322, game operations system 342, team analytics engine 346, league analytics engine 347, statistics engine 350, XML feed and/or instant message feed engine 352, or any other engine may be configured to output participant data (e.g., location data, formation data, play data, role data, ball data, event data, game operations data, team analytics data, league analytics data, statistics data, etc.) to application devices 510 (as shown in FIG. 1) or some specifically configured intermediary device (not shown) for use in fantasy gaming such as fantasy football, baseball, basketball, or the like.

Advantageously, in some example embodiments, real time location systems structured as described herein, may be desirable for fantasy gaming applications as they automate the generation of athletic statistics in contrast to conventional systems which rely on manual entry of various statistics. For example, while conventional systems may require a user to manually identify sacks, interceptions, touchdowns, and the like, real time location systems structured as described herein may programmatically determine these and other fantasy point generating events.

In an example embodiment, an in-stadium fan experience fantasy game may be supported by real time location systems structured as described herein. For example, fans in a stadium for a sporting event (e.g., football game) may register for such fantasy games using an application device 510 (e.g., a smartphone). In one embodiment, fans may register by scanning a barcode, QR code, an alphanumeric code, coupon code or password, RFID tag, magnetic strip, or other identifying information associated with their sporting event ticket or other credential (e.g., VIP pass or season ticket holder credential) with a sensor, such as a sensor 203 as shown in FIG. 3, in communication with the application device 510. Tying registration to a sporting event ticket advantageously ensures that only fans in the sporting event stadium are eligible to participate in the fantasy game. In another embodiment; however, a fan may register without reference to a sporting event ticket (e.g., simply registering via a smartphone application or web browser interface) and in-stadium presence of the fan may be confirmed based on position data (e.g., GPS coordinates, Wi-Fi access points seen, etc.) transmitted by the application device. In further examples, the application, the data or both may only be operable when in the vicinity of the stadium, such as by limiting the distribution of data to an in stadium intranet. In both of these embodiments, tying participation for the fantasy game to in-stadium presence adds value to the purchase of the sporting event ticket.

Alternatively or additionally, the in stadium fan experience may be used outside of the stadium via an application or an application plugin for existing fantasy game applications. For examples, in some cases, the user may have a fantasy football application, but may want to bolster the experience by having additional statistical data, real time (or near real time) feeds or the like. In an example embodiment, player drafts may be imported from an out of stadium application into the in stadium fan experience and or the in stadium fan experience player drafts may be exported to an out of stadium application. Similarly, player drafts and other data may be import to or exported from conventional fantasy sport league applications.

In one embodiment, an in-stadium fan experience fantasy game may be focused only on participants that are actually involved in the sporting event being experienced by fans in the stadium that day. This differs from most fantasy games which rely on multiple participants (e.g., quarterbacks, running backs, wide receivers, defenses, and kickers) from multiple games to ensure an adequate competitive balance among fantasy game players. In the present embodiment, completive balance is ensured because more participants in the sporting event are available to generate fantasy points (e.g., offensive lineman, defensive lineman, linebackers, defensive backs, special teams players, etc.) and more statistics for each participant (e.g., tackle force statistics, blocking force statistics, offensive player grade statistics, defensive player grade statistics, special teams player grade statistics, etc. as are described herein).

Once registered, in-stadium fantasy game players may be prompted by an application or web-based interface running on the application device 510 to select a fantasy team from those participants participating in the sporting event that day. For example, each fantasy game player may be promoted to select two offensive lineman, two defensive lineman, one linebacker, one defensive back, a quarterback, a running back, and a wide receiver. In some embodiments, each fantasy game player may be prompted to select which statistics are to be designated as scoring statistics for each participant. For example, a fantasy game player may designate for each participant one or more of the possible scoring statistics set forth in Table 1 below. Other statistics may be available in alternate or additional embodiments.

TABLE 1

| Participant | Possible Scoring Statistics |
| --- | --- |
| Quarterback | Completions |
| | Passing yards |
| | Touchdowns thrown |

TABLE 1-continued

| Participant | Possible Scoring Statistics |
|---|---|
| Runningback | First downs thrown |
| | Per play QB grade |
| | Rushing yards |
| | Rushing touchdowns |
| | Rushing first downs |
| | Blocking force |
| | Per play RB grade |
| Wide Receiver | Receiving yards |
| | Receiving touchdowns |
| | Receiving first downs |
| | Blocking force |
| | Per play WR grade |
| Tight End | Receiving yards |
| | Receiving touchdowns |
| | Receiving first downs |
| | Blocking force |
| | Per play WR grade |
| Offensive Lineman | Blocking force |
| | Per play OL grade |
| Defensive Lineman | Hitting force |
| | Tackles |
| | Sacks |
| | Per play DL grade |
| Linebacker | Hitting force |
| | Tackles |
| | Sacks |
| | Per play LB grade |
| Defensive back | Hitting force |
| | Tackles |
| | Sacks |
| | Per play DB grade |
| Kicker | Field goals made |
| | Extra points made |
| Special Teams Player (kicking) | Hitting force |
| | Tackles |
| | Tackles inside 10 yard line |
| | Per play ST (kicking) grade |
| Special Teams Player (receiving) | Blocking force |
| | Per play ST (receiving) grade |

Once participants are selected and possible scoring statistics are designated for the fantasy team(s) of each fantasy game player, the teams may be, in some embodiments, organized into groups to define competing teams. For example, in one embodiment, a group of competing teams may be defined by stadium section number (e.g., teams from fantasy game players sitting together in one section may compete against one another). In another embodiment, teams from all fantasy game players in the stadium may be allocated to a single group. In some embodiments, fantasy game players may select or the real time location system may programmatically determine which teams are home and which teams are away.

In some embodiments, teams from a group may compete in head-to-head match-ups (e.g., Team A versus Team B). In another embodiment, each team may compete against all other teams in the group.

In an example embodiment, the group competing teams may include a team designated by an expert in the sport (e.g. former professional player, announcer, coach, or the like). In another example embodiment the group competing teams may include a team designated by a celebrity or other VIP. Participation in the expert or celebrity fantasy group may be based on the type of ticket purchased, such as a season ticket, or a premium price paid to register for the fantasy game.

In an example embodiment, a registered player or group of players, such as season ticket holders may be able to play multiple games. The points form each fantasy game may be scored on a per game basis, aggregate for the games in which the player attended or played the fantasy game, or for all games at the event forum, all games played in the season. Further, the group of players may be carried from one event to the next, so that the group continues competing with the same group, such as season ticket holders.

In an example embodiment, fantasy players may play against a computerized fantasy player. The event engine 322 or other engine may be configured to select fantasy participants based on participant performance information and team performance information from previous games or seasons.

In an example embodiment, the fantasy players may be able to alter the selected participants. In an instance in which the location system determines that a player is unlikely to return to the game, the location system may allow selection of alternate players. For example, participant injury, participant ejection, or the like. The selections of alternate participants may be limited to participants of the same event, team, squad, player role or the like.

In some embodiments, point values may be associated with the designated possible scoring statistics. For example, in the above illustrated statistical table, one or more statistical thresholds may be assigned a point value. For example, in a fantasy football embodiment, points may be defined as follows: 6 points for rushing or receiving a touchdown, 4 points for passing a touchdown, 1 point for each 25 yards passing, −2 points for an intercepted pass, 5 points for a 50 yard field goal, 10 points for 0 points allowed, 1 point for every 50 yards net running, 1 point for each hit of a specified magnitude in hitting force, 1 point for each block of a specified magnitude in blocking force, 1 point for each per play grade (e.g., QB, RB, WR, TE, OL, DL, LB, DB, ST (kicking), ST (receiving)) above a predetermined threshold, or the like. Various other point value architectures (e.g., partial points, bonus points or the like) may be identified by one of ordinary skill in the art consistent with the inventive concepts herein described.

In an example embodiment, the point values associated with the designated possible scoring statistics are stored or generated by the location system 300. The location system 300 may generate a participant data update based on the real time participant data, which may include a scoring statistic. For example, the participant data update may include a hit of a specified magnitude of hit force, a play grade, tackle, or the like. The location system 300 may associate the points associated with the designated scoring statistic with the participant data update and transmit the participant data update to the application device 510. Additionally, the location system 300 may store the participant data update and the associated scoring statistic points in a memory. In an example embodiment, the location system 300 may correlate the scoring statistic points with each player and store the player's aggregate points for the game, season, or series of games to memory and or transmit the player point totals to application devise assigned to the same group.

In an example embodiment, the point values associated with the possible scoring statistics may be stored on the application device 510, such as when the player is playing against a computer player. The application device 510 may receive the participant data update based on the real time participant data, which may include a scoring statistic. The application device 510 may associate the points assigned with the designated scoring statistic and transmit them to the location system 300 for competitive fantasy gaming. Additionally, the application device 510 may store the points in a memory, or display a current point total.

The outcomes of the fantasy game may be used to reward players. For example, players may receive cash, ticket, or merchandise prizes based on their score meeting a threshold, or placement in the group, such as first, second, and third place.

Example Wagering Embodiments

In an example embodiment, the event engine 322, game operations system 342, team analytics engine 346, league analytics engine 347, statistics engine 350, XML feed and/or instant message feed engine 352, or any other engine may be configured to output predictive model outcomes or statistics, and/or probabilities (e.g. odds) for players and teams to application devices 510 (as shown in FIG. 1) or some specifically configured intermediary device (not shown) for use in wagering on a game or events in a game, such as football, baseball, basketball, or the like.

As will be readily appreciated by one of ordinary skill in the art, real time location systems structured as described herein may be desirable for game wagering applications as they automate the generation of predictive and real time athletic statistics in contrast to conventional systems which rely on manual generation of predictions and manual entry of various statistics. For example conventional wagering systems may rely on manual computation of predictive outcomes and statistics for an event, and limited participant data, real time location systems have a larger and more accurate historical participant or team performance data and therefore can programmatically determine predictive models including conventional predicted events and other events which may be wagered on. Further, while conventional systems may require a user to manually identify sacks, interceptions, touchdowns, and the like, real time location systems structured as described herein may programmatically determine these and other wagering events. Indeed, wagering lines may be adapted in real time or near real time because of a detected occurrence on the field of play.

The location system has the additional advantage, in some examples, of being able to determine the time of the event occurrences and the time a wager is made. In conventional wagering, the acceptance of wagers must be stopped with sufficient time to prevent knowledge of the event from being used while wagering. For example, receiving text messages from the event at the wagering station in an attempt to place a bet with the knowledge of the outcome. The application device 510 and/or the locating system 300 may associate a time with the selection of game data or wager. The location system 300 may use the real time location and sensor data to determine the time of the start of an event. Therefore, wagers may be sent prior to and even after the event has begun, however the location system 300 will be able to determine which wagers were submitted prior to the event commencement and accept the wager, and which wagers took place after the commencement of the event and reject the entry of the wager.

The predictive models may include odds for each predicted event determined in the model. For example, the predictive model may determine that the San Francisco Quails will receive 21 points against the Seattle Chipmunks receiving 13 points with the odds being determined as 33 percent. In one example, the predictive model may include player or squad specific predictive models. For example fastest player and distance, Jamal James 40 yards in 4.1 seconds, 27 percent; 6 points allowed by defense, 45 percent, 2 field goals by kicker Matt Prince, 75 percent, or the like.

In some examples, the predictive model may be based on a learning algorithm. Machine learning is often used to develop a particular pattern recognition algorithm (i.e. an algorithm that represents a particular pattern recognition problem) that is based on statistical inference. For example, a set of clusters may be developed using learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In embodiments, content analysis includes a source-specific classifier that takes a source-specific representation of the content received from a particular source as an input, such as from the RTLS system, and produces an output that categorizes that input as being likely to include an indicator that may affect the outcome of the game or not. In some embodiments, the source-specific classifier is a trainable classifier that can be optimized as more instances of content for analysis are received from a particular source.

For example, in some cases, the system may receive an input such a current total of receiving yards in each game for a particular player as well as the outcome of each of those games. For some players, there may be a correlation between total number of receiving yards and the outcome of the game. In such cases, current real time data may be used to predict the total number of yards for the entire game and, thus, a particular predicted outcome may be classified.

The location system 300 may output the predictive model outcomes statistics and/or probabilities, such as point spreads and payout odds as game data to application devices 510. The game data may be selected at the application device 510 and a game data selection indication may be received by the location system 300. For example, the location system 300 may receive a selected game data indication for the San Francisco Quails to win over the Seattle Chipmunks with a 6 point spread: 2-1, Jamel James running 30 yards in 4.0 seconds: 5-1, or Matt Prince successfully kicking 2 field goals: 3-1.

The location may generate game status data throughout the event based on real time participant data by updating the predictive models. For example, the event engine may determine that Jamel James has run 35 yards in 3.9 seconds, and Matt Prince has completed 1 field goal. The location system may generate game status data based on completed and incomplete predictions, and or update game data based on new predictive models, statistics, or odds. For example, the Jamel James game data may be updated as successfully completed, and a new predicted game data may be generated such as Jamel James running 40 yards in 3.9 seconds, 25 percent: 5-1. In another example, Matt Prince may have successfully kicked 1 field goal and the game data may be updated Matt Prince successfully kicking 2 field goals 83 percent 2-1.

In an embodiment, the game data may include wagering data based on the predictive model data. The received selected game data indication may include wagers entered by the user on the application device. The location system 300 may send game status data including the outcome or status of each wager based on the team performance information, player performance information, location data, event determinations, or the like. The location system may receive a selected game data indication that may include the predictive models, statistics, and/or odds that have been selected and an amount wagered. The wagering may be in currency, league (e.g. group) points in a fantasy football league, application points in a game application, reward points for a fan membership program, or any other method of wagering. The location system 300 may update various accounts or billing systems for the game status data wager.

For example, the predictive model, statistics, and odds may include San Francisco Quails winning over Seattle Chipmunks with a 5 point spread, or with odds of 3-1. In an instance in which the game data is updated as successful, e.g., San Francisco wins, or the selected team exceeds the spread, the location system 300 may send game status data including the wager data to the application device, and or various account and billing systems.

Figure 5:
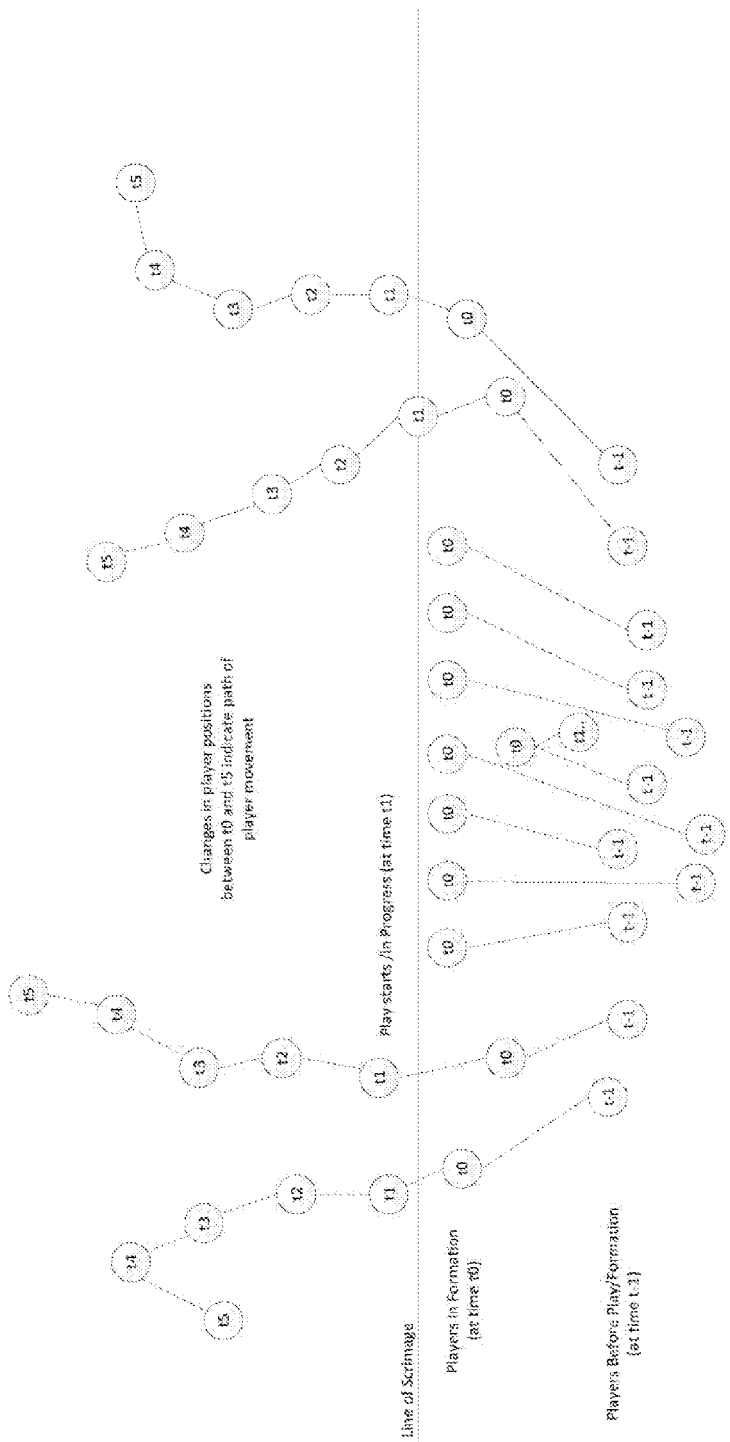
FIG. 5 illustrates example participant tracking over time in accordance with some embodiments of the present invention.

FIG. 5 illustrates example participant (e.g., player) tracking over time in accordance with some embodiments of the present invention. More specifically, FIG. 5 illustrates the changing position of an offensive team during game action. Such tracking of changing positions may be useful for various engines of the present system including, without limitation, the player dynamics engine, the formation engine, the play engine, and the event engine. For example, at a first time, t−1 (e.g., game clock: 12:26, play clock: 38 seconds, universal clock: 16:09:30), the tag location data may indicate that the tracked offensive players are positioned well behind the line of scrimmage, thus, suggesting a low probability of any present formation. However, at a second time, t0 (e.g., game clock: 12:01, play clock: 13 seconds, universal clock: 16:09:55), certain of the tracked players (e.g., offensive linemen and receivers) appear to have positioned themselves proximate the line of scrimmage, thus, suggesting a higher probability of a pro set offensive formation. At a third time, t1 (e.g., game clock: 11:55, play clock: 07 seconds, universal clock: 16:10:01), certain tracked players (e.g., the receivers and the quarterback) move away from the line of scrimmage, thus, suggesting that a play has begun. Additional times, t2 through t5, may be similarly tracked as shown and used by the various engines to hypothesize the occurrence of particular events (formations, play start/stop, penalties, etc.). The tag location data recorded at times t−1 through t5 may provide for a data stream indicating the motions/paths of the various players throughout the duration of a play period. It is noted that FIG. 5 does not illustrate tracking of all the players after t0, or the defensive team players, in order to simplify the illustration.

The team formation engine 312 and/or play engine 318 may analyze player dynamics of multiple players, both offensive and defensive, simultaneously in hypothesizing the possible formations, plays, etc. For example, as discussed briefly above, the formation engine 312 and/or play engine 318 may apply different weights to the tag/sensor/location data received for each player based in part on the player's role versus the formation models or play models, as all the individual player dynamics may not fully correlate to a particular formation or play. The formation engine 312 and/or play engine 318 may then analyze the different models and choose the model, or set of models, that have the highest probability of being accurate based on the weights of all the combined inputs.

Example Processing Apparatus

Figure 6:
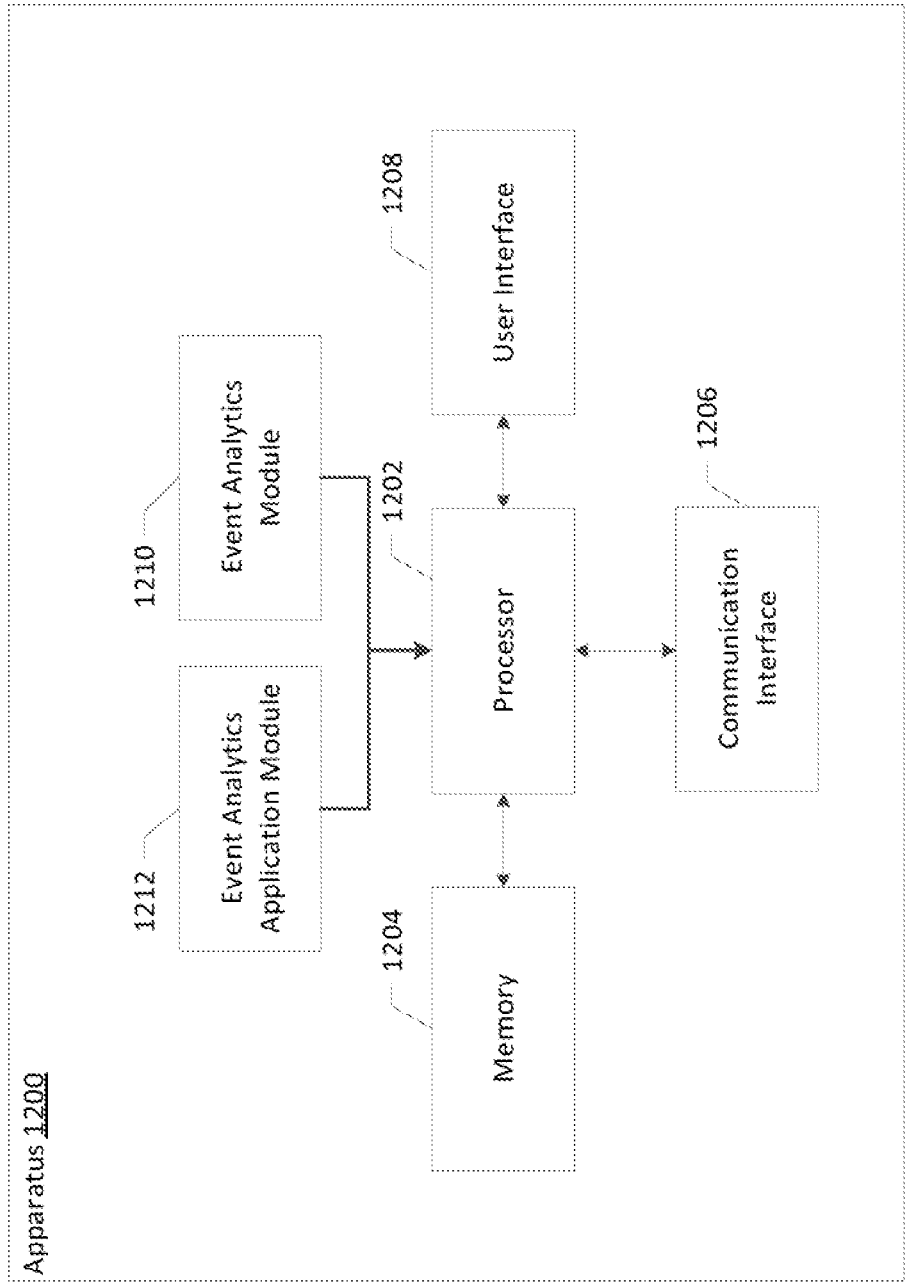
FIG. 6 illustrates a block diagram of components that may be included in devices for performing operations in accordance with some embodiments of the present invention.

FIG. 6 illustrates a block diagram of components that may be included in an apparatus such as the receiver hub 108, receiver processing and distribution system 110, or the application device 510. Apparatus 1200 may comprise one or more processors, such as processor 1202, one or more memories, such as memory 1204, communication circuitry 1206, and user interface 1208. Processor 1202 can be, for example, a microprocessor that is configured to execute software instructions and/or other types of code portions for carrying out defined steps, some of which are discussed herein. Processor 1202 may communicate internally using data bus, for example, which may be used to convey data, including program instructions, between processor 1202 and memory 1204.

Memory 1204 may include one or more non-transitory storage media such as, for example, volatile and/or non-volatile memory that may be either fixed or removable. Memory 1204 may be configured to store information, data, applications, instructions or the like for enabling apparatus 1200 to carry out various functions in accordance with example embodiments of the present invention. For example, the memory could be configured to buffer input data for processing by processor 1202. Additionally or alternatively, the memory could be configured to store instructions for execution by processor 1202. Memory 1204 can be considered primary memory and be included in, for example, RAM or other forms of volatile storage which retain its contents only during operation, and/or memory 1204 may be included in non-volatile storage, such as ROM, EPROM, EEPROM, FLASH, or other types of storage that retain the memory contents independent of the power state of the apparatus 1200. Memory 1204 could also be included in a secondary storage device, such as external disk storage, that stores large amounts of data. In some embodiments, the disk storage may communicate with processor 1202 using an input/output component via a data bus or other routing component. The secondary memory may include a hard disk, compact disk, DVD, memory card, or any other type of mass storage type known to those skilled in the art.

In some embodiments, processor 1202 may be configured to communicate with external communication networks and devices using communications circuitry 1206, and may use a variety of interfaces such as data communication oriented protocols, including X.25, ISDN, DSL, among others. Communications circuitry 1206 may also incorporate a modem for interfacing and communicating with a standard telephone line, an Ethernet interface, cable system, and/or any other type of communications system. Additionally, processor 1202 may communicate via a wireless interface that is operatively connected to communications circuitry 1206 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1x EV-DO, GPRS, W-CDMA, LTE, and/or any other protocol.

The apparatus 1200 may include a user interface 1208 that may, in turn, be in communication with the processor 1202 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 1204, and/or the like).

The apparatus 1200 may include an event analytics module 1210 that may in turn be in communication with the processor 1202. The event analytics engine may be an embodiment of the event engine 322, team analytics engine 346, league analytics engine 348, statistics engine 350, XML feed/IM feed engine, or any other engine of location system 300 of FIG. 4. The event analytics module 1210 may be configured to cause the processor 1202 to transmit participant data, receive a selected participant data indication, generate participant data update, and to cause the communication circuitry 1206 transmit the participant data update. In an example embodiment, the event analytics module 1210 may be further configured to cause the processor 1202 to receive a sensor-application correlator. In an example embodiment, the event analytics module 1210 may be further configured to cause the processor 1202 to generate game status data, and to cause the communication circuitry 1206 to transmit game status data. In an example embodiment, the event analytics module 1210 may be further configured to cause the processor to transmit game data, receive a selected game data indication, and transmit game status data. In an example embodiment, the event analytics module 1210 may be further configured to cause the processor 1202 to cause the communication circuitry 1206 to transmit a request to alter selected participant data.

The apparatus 1200 may include an event analytics application module 1212 that may, in turn, be in communication with the processor 1202. The event analytics engine may be configured to cause the processor 1202 to receive a participant data, receive a selected participant data indication, to cause the communication circuitry 1206 to transmit the selected participant data, and receive a participant data update. In an example embodiment, the event analytics application module 1212 may be configured to cause the processor 1202 to receive sensor data, associate sensor data with an application device, and to cause the communication circuitry 1206 to transmit a sensor-application device correlator. In an example embodiment, the event analytics application module 1212 may be configured to cause the processor 1202 to receive game data, receive a selected game data indication, to cause the communication circuitry 1206 to transmit selected game data, and receive a game status data. In an example embodiment, the event analytics application module 1212 may be configured to cause the processor 1202 to receive a request to alter selected participant data. In an example embodiment, the event analytics application module 1212 may be configured to cause the processor 1202 to cause the game data and/or the participant data update to be displayed on the user interface 1208.

Figure 7:
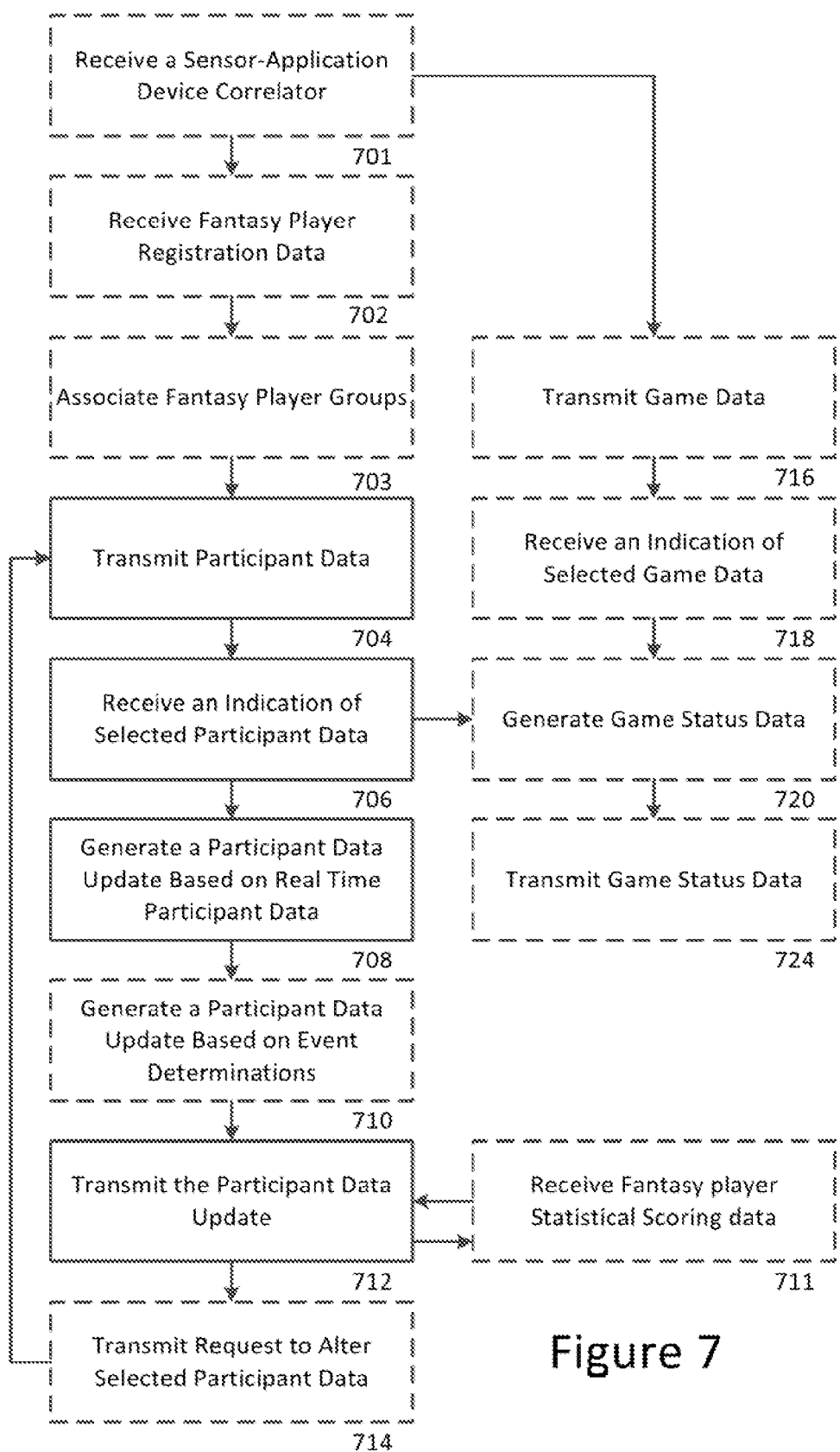
FIG. 7 illustrates an exemplary process for generating participant statistical data and game status data in accordance with some embodiments of the present invention.
Figure 8:
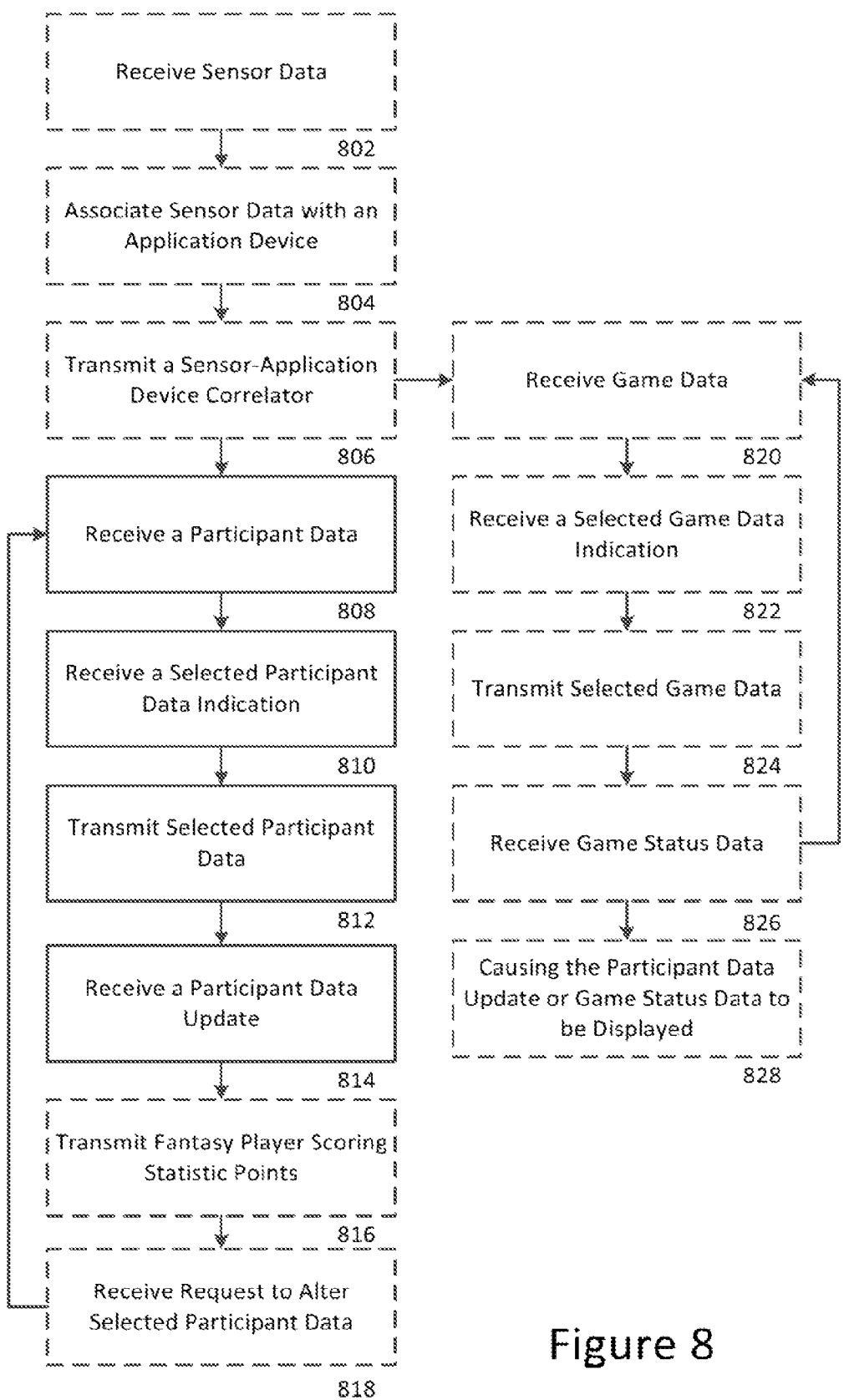
FIG. 8 illustrates an exemplary process for receiving and displaying participant statistical data and game status data.

FIGS. 7 and 8 illustrate example flowcharts of the operations performed by an apparatus, such as apparatus 1200 of FIG. 6, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 1204 of a processing module employing an embodiment of the present invention and executed by a processor 1202 in the processing module. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s).

As such, the operations of FIGS. 7 and 8 when executed, convert a computer or processing circuitry into a particular machine configured to perform an example embodiment of the present invention. Accordingly, the operations of FIGS. 7 and 8 define an algorithm for configuring a computer or processor, to perform an example embodiment. In some cases, a general purpose computer may be provided with an instance of the processor which performs the algorithm of FIGS. 7 and 8 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIGS. 7 and 8). It should be appreciated that each of the modifications, optional additions or amplifications described herein may be included with the operations herein either alone or in combination with any others among the features described herein.

Example Process for Generation of Updated Participant and Game Status Data

FIG. 7 illustrates an exemplary process for generating participant data update and game status data. At 701, the apparatus, such as apparatus 1200 shown in FIG. 6, may include an event analytics module 1210 configured to receive a sensor-application correlator from communication circuitry 1206. The sensor-application device correlator may include data identifying the application device, such as application device 510, and sensor data. The application device identifier may be an IP address, a phone number, or the like. The sensor data may be a barcode (e.g. ticket barcode), alphanumeric code (e.g. a coupon code or password), an RFID, a quick response (QR) code, or the like. In an example embodiment, the sensor data may be position data, such as GPS, or Wi-Fi access point, or the like. In further examples, presence on a particular network may allow for application or device to be authenticated. The processor 1202 may determine a position calculation data based on the received position data. The process may continue at 702 receipt of fantasy player registration data or 716 transmitting game data.

In some embodiments the receipt of a sensor-application device correlator is used to gain access to the application and or application data. In some embodiments, the sensor data of the sensor-application correlator may further include or be associated with a value data, such as currency amount, points in a game or reward points for participant reward systems.

In some embodiments, the sensor data of the sensor-application device correlator may include or be associated with a player registration data. The player registration data may include a fantasy player identifier, such as name seat number, ticket number, or the like; group identifier, such as season ticket group, home group, section 123 group, expert group, or the like, or any other data that may be used to identify the player, group, or the like.

At 702, the event analytic module 1210 may be configured to cause the processor 1202 to receive fantasy player registration data. The processor 1202 may retrieve fantasy player registration data form a memory 1204 in an instance in which the fantasy player has pre-registered, or registered for previous games. The registration data may include the fantasy player identifier, fantasy group identifier application device identifier, current point value, or the like.

In an example embodiment, fantasy player registration data may be generated by the processor 1202 based on the received sensor-application device correlator. The processor 1202 may generate the registration data including the fantasy player identifier, fantasy group identifier, application device identifier, starting point value or the like.

At 703, the event analytics module 1210 may be configured to cause the processor to determine fantasy player groups. The fantasy player groups may be retrieved from a memory 1204, in an instance in which the fantasy groups were determined at registration, or in an instance in which the fantasy group has been established during previous games.

In an example embodiment, the processor may determine fantasy groups based on the sensor data. For example, ticket or seat identifiers may be used to generate groups based on section, season ticket holders, all present fantasy players, or the like. In another example, the groups may be determined based on the registration data, such as the type of group selected and/or purchased, such as home group, away group, expert group, celebrity group, or the like.

At 704, the event analytics module 1210 may be configured to cause the processor 1202 to transmit participant data using the communication circuitry 1206. Participant data may include the upcoming or current event or game, participating teams, participating squads, participating players, scoring statistics, or the like. An example of scoring statistics is provided above in Table 1. For example, participant data may include San Francisco Quails V. Seattle Chipmunks Dec. 8, 2013, as an event, San Francisco and/or Seattle, as the team, defense or offense as the squad, and a team roster or individual players, as the participants. The communication circuitry 1206 may transmit the participant data to the application device 510 using cellular signals, Wi-Fi, or the like.

At 706, the event analytics module 1210 may be configured to cause the processor 1202 to receive a selected participant data indication from the communication circuitry 1206. The communication circuitry 1206 may receive the selected participant data indication form an application device 510. The selected participant data may be an event, team, squad, individual participants, and/or scoring statistics for each participant or participant player role. For example, San Francisco Quails V. Seattle Chipmunks Dec. 8, 2013; San Francisco, offense two offensive lineman, two defensive lineman, one linebacker, one defensive back, a quarterback, a running back, and a wide receiver; and/or scoring statistics for each participant. The process may continue at 708 generating a participant data update and/or 720 generating game status data.

At 708, the event analytics module 1210 may be configured to cause the processor 1202 to generate a participant data update. The processor 1202 may generate participant data update based on real time updates to the selected participant data as it is updated throughout the game or event. The participant data may include location data, formation data, play data, role data, ball data, event data, game operations data, team analytics data, league analytics data, statistics data, or the like. Participant data update based on real time participant data may include speed, acceleration, rushing yards, passing yards, net run distance, open field tackle, hit of a specified force magnitude, or the like for an individual participant or the aggregate totals for a team.

At 710, the event analytics module 1210 may be configured to cause the processor 1202 to generate participant data update based on event data determinations. The processor 1202 may determine an event has occurred as discussed in FIG. 4. Participant data update based on event determinations may include an interception, completed pass, touchdown, sack, field goal, or the like.

In an example embodiment, a point value may be associated with the participant data update. The processor 1202 may generate scoring statistic points as a portion of or associate with the participant data update, or generate an aggregate point value. For example, in fantasy football scoring statistic points may include 6 points for rushing or receiving a touchdown, 4 points for passing a touchdown, 1 point for each 25 yards passing, −2 points for an intercepted pass, 5 points for a 50 yard field goal, 10 points for 0 points allowed, 1 point for every 50 yards net running, 1 point for each hit of a specified magnitude in hitting force, 1 point for each block of a specified magnitude in blocking force, 1 point for each per play grade (e.g., QB, RB, WR, TE, OL, DL, LB, DB, ST (kicking), ST (receiving)) above a predetermined threshold, or the like.

The processor 1202 may update fantasy player registration data based on the scoring statistic points associated with the participant data update. The processor 1202 may store the scoring statistic points in a memory 1204 for later analysis or transmission.

At 712, the event analytics module 1210 may be configured to cause the processor 1202 to transmit the participant data update using the communication circuitry 1206. The communications circuitry 1206 may transmit the participant data update to the application device 510 using cellular signals, Wi-Fi, or the like.

In an embodiment in which the scoring statistic points are determined by the application device 510 based on the participant data update, the event module 1210 may be configured to cause the processor 1202 to receive fantasy player scoring statistic points from the communication circuitry 1206, at 711. The communication circuitry 1206 may receive fantasy player scoring statistic points from the application devices 510. The processor 1202 may associate the scoring statistic points with a fantasy player registration data based on the application device identifier in the sensor-application device correlator or the fantasy player registration data. The processor 1202 may also store the scoring statistic points in memory 1204 for later analysis or transmission.

In an example embodiment, the processor 1202 may be configured to cause the communication circuitry 1204 to transmit the current or aggregate total scoring statistic points of other fantasy players to application devices 510 within the fantasy group.

At 714, the event analytics module 1210 may be configured to cause the processor 1202 to transmit a request to alter selected participant data. The processor 1202 may transmit the request to alter participant data based on a determination that a participant is unlikely to return to the game, as discussed in FIG. 4. For example, the participant is injured, the participant is ejected from the game, or the like. The processor 1202 may cause the communications circuitry 1206 to transmit the request to alter selected participant data to the application device 510 using cellular signals, Wi-Fi, or the like.

In some examples, the transmitted participant data based on the transmission of a request to alter selected participants may be limited. For example, the participant data may be limited to only participants with the same player role, only participants from the team previously selected, participants from the same squad (e.g. defense or offense), or the like. Once, the altering of selected participant data occurs, the process may return to 704.

In an example embodiment, the event analytics module 1210 may be configured to cause the processor 1202 to cause the communication circuitry 1206 to transmit game data. The processor 1202 may receive or generate predictive models or statistics, and/or probabilities (e.g. event odds) for players and teams. The predictive models may be generated for each event and based on and the participant data of the teams and players expected to participant, event location, time of data, or the like. The predictive models may be further based on the historical team performance information, historical participant performance information, historical weather data, predicted weather data, or the like. The processor 1202 may generate game data based on the predictive models. Game data may include predicted outcomes for the event, participants, or squads. For example, the winner of the event, point spread, odds, or number of points allowed for a defense, passing yards, touchdowns, field goals or sacks by a particular player, or the like. For example, Jamal James 40 yards in 4.1 seconds, 27 percent; 6 points allowed by defense, 45 percent, 2 field goals by kicker Matt Prince, 75 percent; San Francisco Quails: 21 points V. Seattle Chipmunks: 13 points, 33 percent probability, or the like. The communications circuitry 1206 transmit the game data to the application device 510 using cellular signals, Wi-Fi, or the like.

At 718, the event analytics module 1210 may be configured to cause the processor 1202 to receive a selected gaming data indication from the communication circuitry 1206. The communication circuitry 1206 may receive the selected game data indication form the application device 510. For example, the selected game data indication may include, San Francisco Quails to win over the Seattle Chipmunks with a 6 point spread, Jamel James running 30 yards in 4.0 seconds, or Matt Prince successfully kicking 2 field goals.

In some embodiments the selected game data indications may include wagering data. Wagering data may include a value associated with the wager and the selected odds, probability, or points spread of the game data selected. A wagering value may be in currency, league points in a fantasy football league, application points in a game application, reward points for a fan membership program, or any other method of wagering. For example, San Francisco Quails to win over the Seattle Chipmunks with a 6 point spread; 500 points wagered, Jamel James running 30 yards in 4.0 seconds; 300 points wagered, or Matt Prince successfully kicking 2 field goals; 200 points wagered Account total: 15,400 points. In another example, points or other wagering medium may be rewarded based on correct wagering and no points are lost for an incorrect wager.

At 720, the event analytics module 1210 may be configured to cause the processor 1202 to generate game status data. The game status data may be based on the selected participant data or participant data update. Game status data may include updated game data for completed and incomplete game data selections, for example, Jamel James has run 35 yards in 3.9 seconds-Complete.

In an example embodiment, the processor 1202 may also generate game status data based event determinations. The event determinations may be substantially similar to event determinations discussed at 710. Game status data based on event determinations may include updated game data for completed and incomplete game data selections. For example, Matt Prince has completed 1 field goal-50 percent complete.

In some embodiments, the game status data may include wager data, wager data may include a value associated with each selected game data, or an aggregate total for the wagers made and/or account value. For example, Jamel Jones has run 35 yards in 3.9 seconds-Complete: 100 points wagered (3-1), 300 points earned, and Matt Prince has completed 1 field goal-50 percent complete: 200 points wagered (2-1), Account total: 15,700 points.

At 724, the event analytics module may be configured to cause the processor 1202 may cause the communications circuitry 1206 to transmit game status data. The communications circuitry 1206 may transmit the game status data to the application device 510. The communication circuitry 1206 may transmit the game status data to the application device 510 using cellular signals, Wi-Fi, or the like.

In an example embodiment in which the game status data includes wager data, the processor 1202 may transmit the wager data portion of the game status data to various account data bases for credit and debit of the wager values, such as reward accounts, application accounts, credit card accounts, bank accounts, or the like. The communication circuitry 1206 may transmit the game status data to various account databases using wired or wireless communication.

Example Process for Receiving and Displaying
Participant Data Update and Game Status Data FIG. 8 illustrates an exemplary process for receiving and displaying participant data update and game status data. At 802, the apparatus such as apparatus 1200 shown in FIG. 6, may include an event analytics application module 1212 configured to cause the processor 1202 to receive a sensor data from communication circuitry 1206. The communications circuitry 1206 may be in communication with a sensor, similar to sensors 203 of FIG. 3. Sensors may include a barcode reader, magnetic strip reader, QR code reader, RFID reader, or the like Sensor data may include identification data form a barcode, a radio frequency identifier (RFID), a magnetic strip, or other identification device. For example, the identification data may be a ticket or coupon barcode or QR code, a credit card or rewards card magnetic strip, an RFID embedded item or card, such as a VIP card, or the like. In an example embodiment, the sensor 203 may be a triangulation positioner, such as GPS.

At 804, the event analytics application module 1212 may be configured to cause the processor 1202 to associate the sensor data with an application device 510. The processor may associate the sensor data and the application device by generating a sensor-application device correlator. The sensor-application device correlator may include data identifying the application device 510, and sensor data. The application device identifier may be an IP address, a phone number, or the like. The sensor data may be a barcode (e.g. ticket barcode), alphanumeric code (e.g. a coupon code or password), an RFID, a quick response (QR) code, or the like.

In an example embodiment, the sensor data may include position data which may be used by the receiver hub 108 or receiver processing and distribution system 110 to determine a position calculation data. In an example embodiment, the sensor data may include the position calculation data determined by the application device.

In some embodiments, the sensor data of the sensor-application correlator may further include or be associated with a value data, such as currency amount, points in a game, or reward points for participant reward systems. In some embodiments, the sensor data of the sensor-application device correlator may include or be associated with a player registration data. The player registration data may include a fantasy player identifier, such as name seat number, ticket number, or the like; group identifier, such as season ticket group, home group, section 123 group, expert group, or the like, or any other data that may be used to identify the player, group, or the like.

At 806, the event analytics application module 1212 may be configured to cause the processor 1202 to cause the communications circuitry 1206 to transmit the sensor-application device correlator. The communication circuitry 1206 may transmit the sensor-application device correlator to the receiver hub 108 or receiver processing and distribution system 110 through Wi-Fi, cellular, or the like. The process may continue at 808 and/or 820.

At 808, the event analytics application module 1212 may be configured to cause the processor 1202 to receive participant data from the communication circuitry 1206. The communications circuitry 1206 may receive the participant data from the receiver hub 108 or the receiver processing and distribution system 110 as shown in FIG. 1 or 300 as shown in FIG. 4. The participant data may include a list of events, teams, squads, participating players, scoring statistics, or the like. An example of scoring statistics is provided above in Table 1. The participant data may further include historical statistics associated with each participant or team. The processor 1202 may be configured to display the participant data on a user interface such as 1208. For example, the participant data may include San Francisco Quails V. Seattle Chipmunks Dec. 8, 2013 as an event, San Francisco and/or Seattle Seahawks for the team, offense or defense for the squad, and a team roster or individual players for the participants.

At 810, the event analytics module 1212 may be configured to cause the processor 1202 to receive a selected participant data indication. The selected participant data indication may be received from the user interface 1208 or generated by the processor 1202. In an instance in which the processor receives the selected participant indication from the user interface 1208 the user may select the event, team, or individual participants from the participant data. In an instance in which the processor 1202 generates the selected participant data indication, the processor may randomly select the participant data, or the selection may be done based on highest statistics associated with a participant, previously selected participants, or the like. For example, the user may be prompted with a participant list and a request to select 1 event, such as San Francisco Quails V. Seattle Chipmunks Dec. 8, 2013; 1 team, such as San Francisco and/or Seattle; 1 squad, such as offense; two offensive lineman, two defensive lineman, one linebacker, one defensive back, a quarterback, a runningback, and a wide receiver; and/or scoring statistics for each participant. In some embodiments, the participant selection must be player role specific.

At 812, the event analytics application module 1212 may be configured to cause the processor 1202 to cause the communication circuitry 1206 to transmit the selected participant data indication. The communication circuitry 1206 may transmit the selected participant data to the receiver hub 108 or receiver processing and distribution system 110 through Wi-Fi, cellular signals, or the like.

At 814, the event analytics application module 1212 may be configured to cause the processor 1202 to receive participant data update form the communication circuitry 1206. The communication circuitry 1206 may receive the participant data update from the receiver hub 108 or receiver processing and distribution system 110. The participant data update may be based on the real time updates to selected participant data The participant data may include location data, formation data, play data, role data, ball data, event data, game operations data, team analytics data, league analytics data, statistics data, or the like. Participant data update based on real time participant data may include speed, acceleration, rushing yards, passing yards, net run distance, open field tackle, hit greater than a specified force magnitude, or the like for an individual participant or the aggregate totals for a team.

In an example embodiment, the processor 1202 may be configured to receive participant statistical data based on event determinations. Examples of event determinations are provided above in FIG. 4. A participant data update based on event determinations may include an interception, completed pass, touchdown, sack, field goal, or the like.

In an example embodiment, a scoring statistic point value may be received as a portion of or associated with the participant data update. The processor 1202 may receive and display the points with the participant data update, or receive and display an aggregate point value. For example in fantasy football points may include 6 points for rushing or receiving a touchdown, 4 points for a passing touchdown, 1 point for each 25 yards passing, −2 points for an intercepted pass, 5 points for a 50 yard field goal, 10 points for 0 points allowed, 1 point for every 50 yards net running, 1 point for each hit of a specified magnitude, 1 point for each block of a specified magnitude in blocking force, 1 point for each per play grade (e.g., QB, RB, WR, TE, OL, DL, LB, DB, ST (kicking), ST (receiving)) above a predetermined threshold, or the like. In an example embodiment, the event analytics application module 1212 may be configured to cause the processor 1202 to determine scoring statistic points based on the received participant data update. The processor 1202 may determine points as discussed above.

At 816, the event analytics module 1210 may be configured to cause the processor 1202 to cause the transmission of fantasy player scoring statistic points, in an embodiment in which the event analytics engine is configured to determine the scoring statistic points based on the participant data update. The processor 1202 may cause the communications circuitry 1206 to transmit the fantasy player scoring statistic points to the receiver hub 108 or receiver processing and distribution system 110. The communication circuitry 1206 may transmit the fantasy player scoring statistics points using Wi-Fi, cellular signals, or the like.

At 818, the event analytics application module 1212 may be configured to cause the processor 1202 to receive a request to alter selected participant data from the communication circuitry 1206. The communication circuitry 1206 may receive the request to alter selected participant data from the receiver hub 108 or receiver processing and distribution system 110. The request to alter selected participant data may include data associated with the cause of the request. For example, the cause for the request may be participant injury, participant ejection from the event, or the like. In an instance in which the processor receives a request to alter the selected participant data, the process may continue at 708 receiving participant data. The participant data may be limited, in an instance in which it is associated with the request to alter the selected participant data. For example, the participant data may be limited to only participants with the same player role, only participants from the team previously selected, participants from the same squad (e.g. defense or offense), or the like.

At 820, the event analytics application module 1212 may be configured to cause the processor 1202 to receive game data from the communication circuitry 1206. The communication circuitry 1206 may receive the game data from the receiver hub 108 or receiver processing and distribution system 110. Game data may include predicted outcomes for the event, participants, or squads. For example, the winner of the event, point spread, odds, or number of points allowed for a defense, passing yards, touchdowns, field goals or sacks by a particular player, or the like. The processor may be configured to cause the game data to be displayed on a user interface 1208. For example, Jamal James 40 yards in 4.1 seconds, 27 percent; 6 points allowed by defense, 45 percent, 2 field goals by kicker Matt Prince, 75 percent, or the like.

At 822, the event analytics application module 1212 may be configured to cause the processor 1202 to receive a selected game data indication. The processor 1202 may receive the selected game data indication form the user interface 1208 or be generated by the processor. In an instance in which the selected game data indication is generated at the processor 1202, the processor may select the game data randomly, or based on odds, point spread, preselected factors, or the like. In an event in which the processor 1202 receives the selected game data indication using the user interface 1208, the user may select one or more of the game data. For example, the selected game data indication may include, San Francisco Quails to win over the Seattle Chipmunks with a 6 point spread, Jamel James running 30 yards in 4.0 seconds, or Matt Prince successfully kicking 2 field goals.

In some embodiments the selected game data indications may include wagering data. Wagering data may include a value associated with the wager and the selected odds, or points spread of the game data selected. A wagering value may be in currency, league points in a fantasy football league, application points in a game application, reward points for a fan membership program, or any other method of wagering. For example, San Francisco Quails to win over the Seattle Chipmunks with a 6 point spread; 500 points wagered, Jamel James running 30 yards in 4.0 seconds; 300 points wagered, or Matt Prince successfully kicking 2 field goals; 200 points wagered Account total: 15,400 points. In another example embodiment, points or other wagering medium may be awarded for a correct wager and no points lost for an incorrect wager.

At 824, the event analytics application module 1202 may be configured to cause the processor 1202 to cause the communication circuitry 1206 to transmit the selected game data. The communication circuitry 1206 may transmit the selected game data to the receiver hub 108 or receiver processing and distribution system 110 through Wi-Fi, cellular signals, or the like.

At 826, the event analytics application module 1212 may be configured to cause the processor 1202 to receive game status data from the communication circuitry 1206. The communication circuitry 1206 may receive the game status data from the receiver hub 108 or the receiver processing and distribution system 110. The game status data may be based on the selected participant data, participant data update, and/or event determinations. Game status data may include updated game data for completed and incomplete game data selections, for example, Jamel James has run 35 yards in 3.9 seconds-Complete, and Matt Prince has completed 1 field goal-50 percent complete.

In some embodiments, the game status data may include wager data, wager data may include a value associated with each selected game data, or an aggregate total for the wagers made and/or account value. For example, Jamel James has run 35 yards in 3.9 seconds-Complete: 100 points wagered (3-1), 300 points earned, and Matt Prince has completed 1 field goal-50 percent complete: 200 points wagered (2-1), Account total: 15,700 points.

At 828, the event analytics application module 1212 may be configured to cause the processor 1202 to display the game data and/or the participant data update on a user interface 1208. The processor 1202 may display selected portions or all game status data or participant data update received. In embodiments in which the participant data update includes or is associated with scoring statistic points, the scoring statistic points for each selected participant, team, event, or the like, and/or the aggregate total scoring statistic points may be displayed on the user interface 1208. In embodiments in which game status data includes wager data, the wager data for each selected game data, and/or account or wager totals may be displayed on the user interface 1208.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising: transmitting participant data relating to one or more participants that are available in a fantasy game, wherein the fantasy game is at least partially related to a player's performance in a sporting event;
receiving a selected participant data indication from at least one user, wherein the selected participant data indication provides selection of at least one participant from the participant data; generating a participant data update for one or more participants based on the selected participant data indication; wherein the participant data is defined by a time period comprising an event and is calculated based on blink data transmitted from a location tag mounted to the participant; and transmitting the participant data update, wherein the participant data update is viewable using a user interface;
wherein the participant data update is further based on event determinations, wherein the event determinations are based on the participant location data satisfying a predetermined event probability threshold.

2. The method of claim 1 further comprising:
receiving a sensor-application device correlator; and
wherein the transmitting the participant data update is based on the sensor-application device correlator.

3. The method of claim 1 further comprising:
generating game status data based on the selected participant data; wherein the participant data is based on the participant location data, wherein the participant location data is calculated based on blink data transmitted from a location tag mounted to the participant; and
transmitting game status data.

4. The method of claim 3 further comprising:
transmitting game data related to one or more probability or statistical odd at least partially based on a predictive model based on previous sporting events;
receiving a selected game data indication from at least one user, wherein the selected game data indication provides selection of at least one probability or statistical odd from the game data;
wherein generating game status data is further based on the selected game data; and
transmitting game status data.

5. The method of claim 1 further comprising:
transmitting a request to alter selected participant data, wherein the request to alter selected participant data is based on participant statistical data.

6. An apparatus comprising at least one processor and at least one memory including computer program code, the at least one memory and computer program code configured to, with the processor, cause the apparatus to at least:
transmit participant data relating to one or more participants that are available in a fantasy game, wherein the fantasy game is at least partially related to a player's performance in a sporting event; receive a selected participant data indication from at least one user, wherein the selected participant data indication provides selection of at least one participant from the participant data; generate a participant data update for one or more participants based on the selected participant data indication; wherein the participant data is defined by a time period comprising an event and is calculated based on blink data transmitted from a location tag mounted to the participant; and transmit the participant data update, wherein the participant data update is viewable using a user interface; wherein the participant data update is further based on event determinations, wherein the event determinations are based on the participant location data satisfying a predetermined event probability threshold.

7. The apparatus of claim 6, wherein the at least one memory and the computer program code are further configured to:
receive a sensor-application device correlator; and
wherein the transmitting the participant data update is based on the sensor-application device correlator.

8. The apparatus of claim 6, wherein the at least one memory and the computer program code are further configured to:
generate game status data based on the selected participant data; wherein the participant data is based on the participant location data, wherein the participant location data is calculated based on blink data transmitted from a location tag mounted to the participant; and
transmit game status data.

9. The apparatus of claim 8, wherein the at least one memory and the computer program code are further configured to:
transmit game data related to one or more probability or statistical odd at least partially based on a predictive model based on previous sporting events;
receive a selected game data indication from at least one user, wherein the selected game data indication provides selection of at least one probability or statistical odd from the game data;
wherein generating game status data is further based on the selected game data; and
transmit game status data.

10. The apparatus of claim 6, wherein the at least one memory and the computer program code are further configured to:
transmit a request to alter selected participant data, wherein the request to alter selected participant data is based on participant statistical data.

11. A computer program product comprising at least one non-transitory computer-readable storage medium having computer-executable program code portions stored therein, the computer-executable program code portions comprising program code instructions configured to: transmit participant data relating to one or more participants that are available in a fantasy game, wherein the fantasy game is at least partially related to a player's performance in a sporting event; receive a selected participant data indication from at least one user, wherein the selected participant data indication provides selection of at least one participant from the participant data; generate a participant data update for one or more participants based on the selected participant data indication; wherein the participant data is defined by a time period comprising an event and is calculated based on blink data transmitted from a location tag mounted to the participant; and transmit the participant data update, wherein the participant data update is viewable using a user interface; wherein the participant data update is further based on event determinations, wherein the event determinations are based on the participant location data satisfying a predetermined event probability threshold.

12. The computer program product of claim 11, wherein the computer-executable program code portions further comprise program code instructions configured to:
   receive a sensor-application device correlator; and
   wherein the transmitting the participant data update is based on the sensor-application device correlator.

13. The computer program product of claim 11, wherein the computer-executable program code portions further comprise program code instructions configured to:
   generate game status data based on the selected participant data; wherein the participant data is based on the participant location data, wherein the participant location data is calculated based on blink data transmitted from a location tag mounted to the participant; and
   transmit game status data.

14. The computer program product of claim 13, wherein the computer-executable program code portions further comprise program code instructions configured to:
   transmit game data related to one or more probability or statistical odd at least partially based on a predictive model based on previous sporting events;
   receive a selected game data indication from at least one user, wherein the selected game data indication provides selection of at least one probability or statistical odd from the game data;
   wherein generating game status data is further based on the selected game data; and
   transmit game status data.

15. The computer program product of claim 11, wherein the computer-executable program code portions further comprise program code instructions configured to:
   transmit a request to alter selected participant data, wherein the request to alter selected participant data is based on participant statistical data.

* * * * *